United States Patent
Miyagi et al.

(10) Patent No.: US 11,039,133 B2
(45) Date of Patent: Jun. 15, 2021

(54) IMAGE PROCESSING APPARATUS AND IMAGE PROCESSING METHOD FOR INHIBITING APPLICATION OF AN OFFSET TO PIXELS OF AN IMAGE

(71) Applicant: SONY CORPORATION, Tokyo (JP)

(72) Inventors: Yusuke Miyagi, Kanagawa (JP); Yoshitaka Morigami, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/623,143

(22) PCT Filed: Apr. 12, 2018

(86) PCT No.: PCT/JP2018/015377
§ 371 (c)(1),
(2) Date: Dec. 16, 2019

(87) PCT Pub. No.: WO2018/235405
PCT Pub. Date: Dec. 27, 2018

(65) Prior Publication Data
US 2020/0195923 A1 Jun. 18, 2020

(30) Foreign Application Priority Data
Jun. 23, 2017 (JP) .............................. JP2017-123013

(51) Int. Cl.
*H04N 19/117* (2014.01)
*H04N 19/157* (2014.01)
(Continued)

(52) U.S. Cl.
CPC ......... *H04N 19/117* (2014.11); *H04N 19/157* (2014.11); *H04N 19/176* (2014.11); *H04N 19/42* (2014.11)

(58) Field of Classification Search
CPC ... H04N 19/176; H04N 19/186; H04N 19/117
See application file for complete search history.

(56) References Cited

U.S. PATENT DOCUMENTS

| 2014/0169452 A1* | 6/2014 | Lim | H04N 19/147 375/240.03 |
| 2014/0192860 A1* | 7/2014 | Onno | H04N 19/30 375/240.02 |

(Continued)

FOREIGN PATENT DOCUMENTS

| JP | 2014-131270 A | 7/2014 |
| WO | WO 2013/070707 A1 | 5/2013 |

OTHER PUBLICATIONS

ITU-T, High efficiency video coding, Series H: Audiovisual and Multimedia Systems, Infrastructure of audiovisual services—Coding of moving video, Recommendation ITU-T H.265, Apr. 2013, pp. 1-300, International Telecommunication Union.

*Primary Examiner* — Zhubing Ren
(74) *Attorney, Agent, or Firm* — Paratus Law Group, PLLC

(57) ABSTRACT

A filter processing section 352 performs a filter process for applying an offset to pixels of a decoded image. A filter controller 351 inhibits the offset from being applied to an edge portion depending on occurrence of a transform unit in a transformation skip mode in which orthogonal transformation is not performed on a predicted residual. Furthermore, the filter controller 351 determines whether an offset for gradation adjustment using the decoded image is to be applied in the filter processing section 352 or not, and sets an offset in case the offset is to be applied. It is possible to make less conspicuous in the boundary between a transform unit where orthogonal transformation is performed by the offset for gradation adjustment and the transform unit where orthogonal transformation is skipped. The image quality of the decoded image is restrained from being lowered.

12 Claims, 24 Drawing Sheets

(51) Int. Cl.
*H04N 19/176* (2014.01)
*H04N 19/42* (2014.01)

(56) References Cited

U.S. PATENT DOCUMENTS

| | | | |
|---|---|---|---|
| 2015/0326863 A1* | 11/2015 | Francois | H04N 19/157 375/240.24 |
| 2017/0019668 A1 | 1/2017 | Morigami et al. | |
| 2017/0019685 A1 | 1/2017 | Morigami et al. | |

* cited by examiner

FIG. 3
(a)
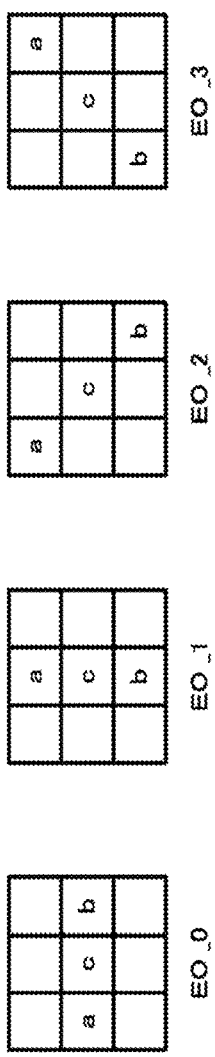
(b)
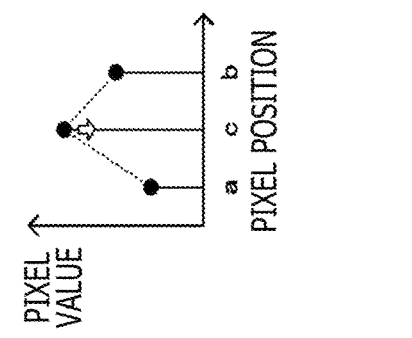
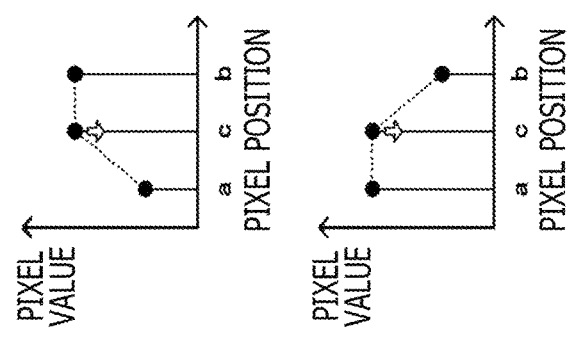
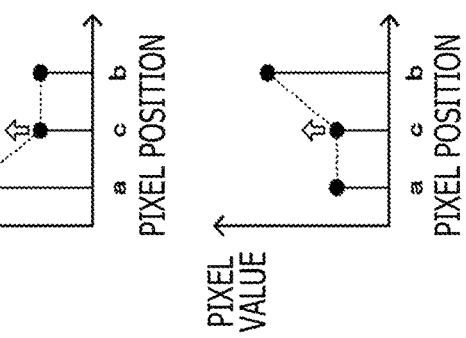
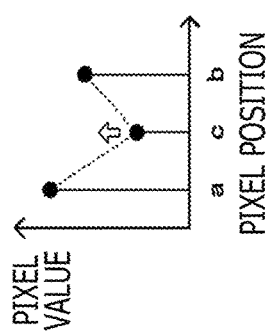

| BAND | 0 | | 4 | 5 | 6 | 7 | | 30 | 31 |
|---|---|---|---|---|---|---|---|---|---|
| SUM OF EERRORS | 0 | | 0 | 1638 | 0 | 0 | | 4 | 0 |
| THE NUMBER OF BELONGING PIXELS | 0 | | 0 | 63 | 192 | 0 | | 1 | 0 |

FIG.11
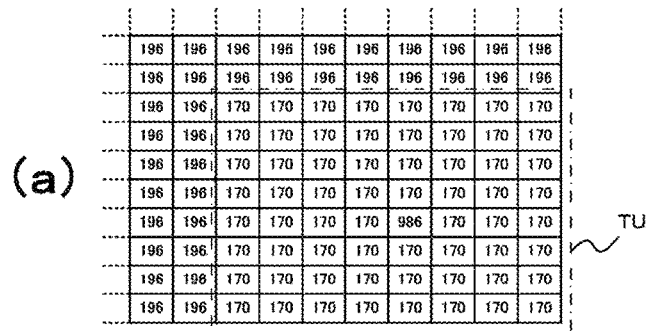
(a)
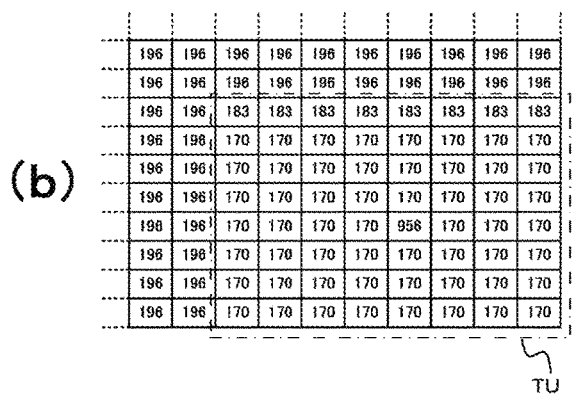
(b)
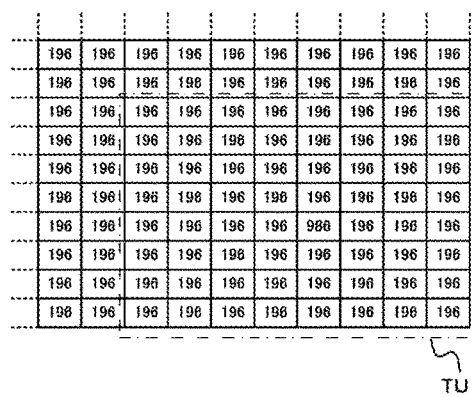
(d)
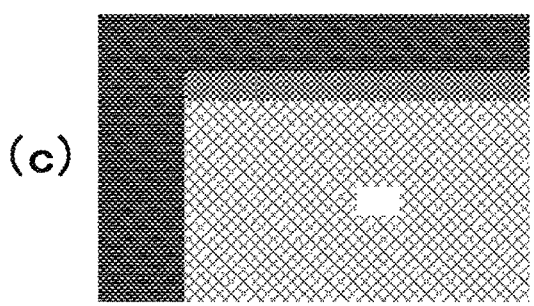
(c)
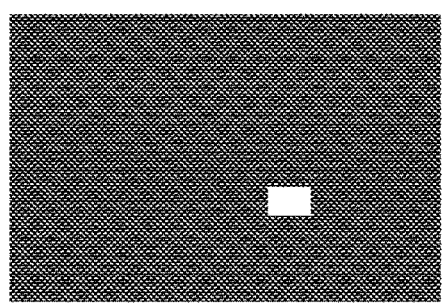
(e)

FIG.12
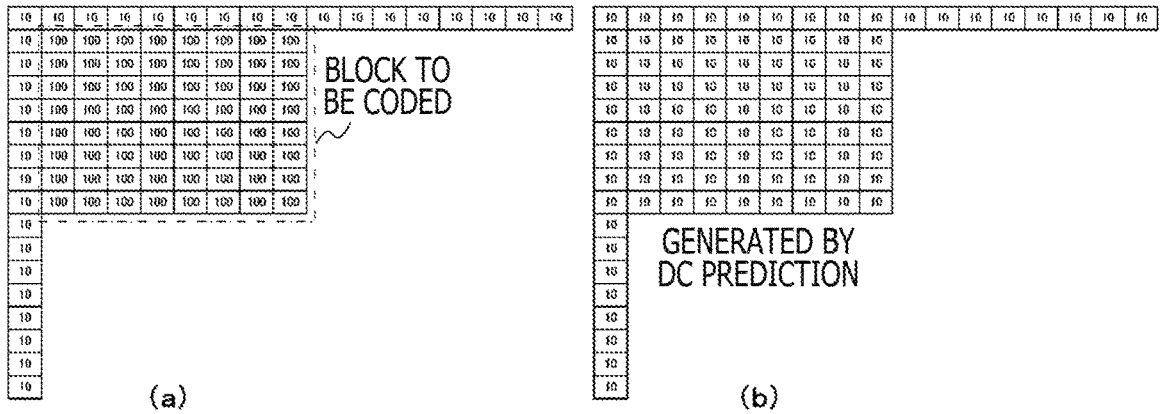
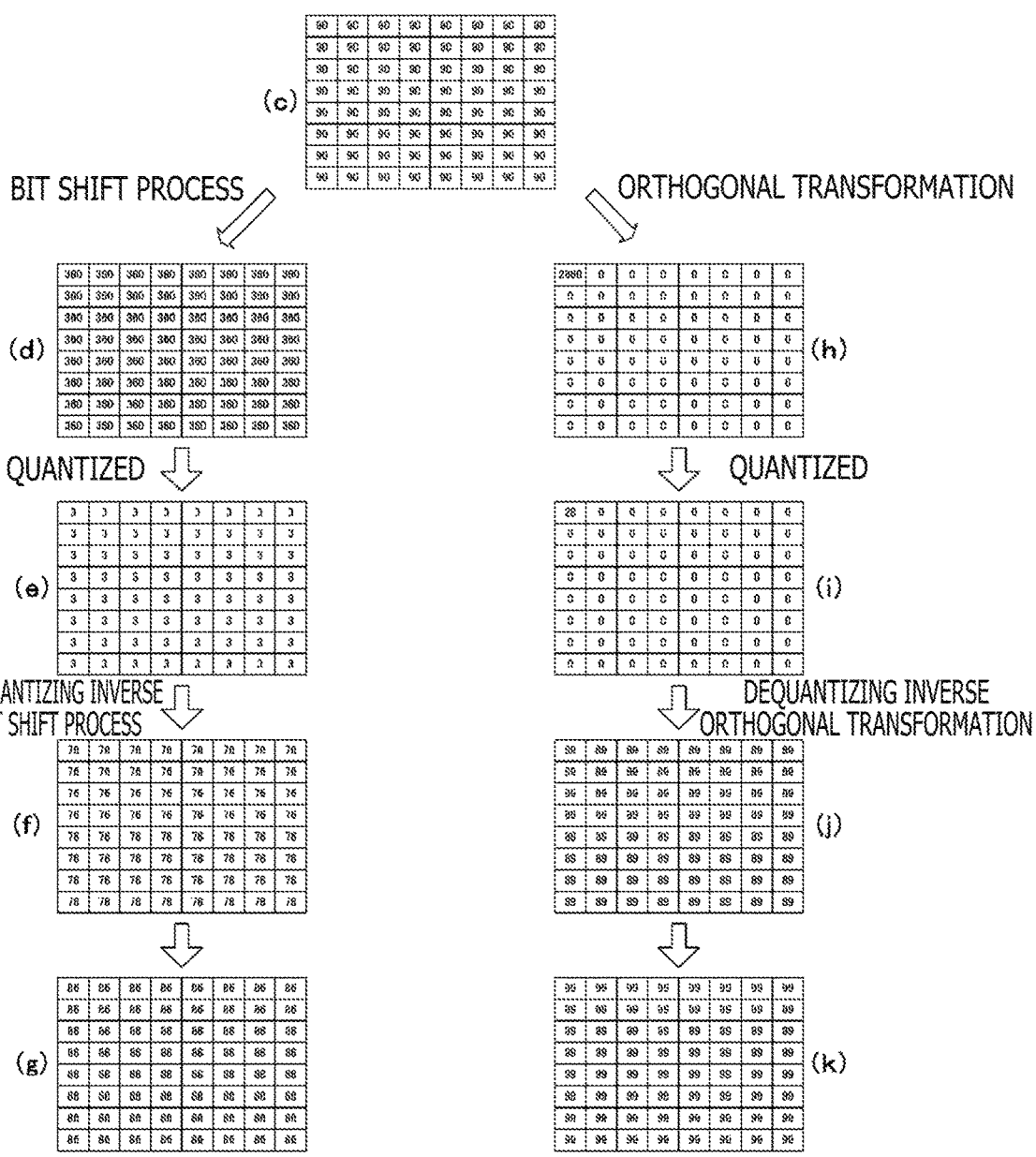

FIG.13

IMAGE PROCESSING APPARATUS AND IMAGE PROCESSING METHOD FOR INHIBITING APPLICATION OF AN OFFSET TO PIXELS OF AN IMAGE

CROSS REFERENCE TO PRIOR APPLICATION

This application is a National Stage Patent Application of PCT International Patent Application No. PCT/JP2018/015377 (filed on Apr. 12, 2018) under 35 U.S.C. § 371, which claims priority to Japanese Patent Application No. 2017-123013 (filed on Jun. 23, 2017), which are all hereby incorporated by reference in their entirety.

TECHNICAL FIELD

The present technology relates to an image processing apparatus and an image processing method, making it possible to restrain a reduction in the image quality of decoded images.

BACKGROUND ART

Heretofore, for transmitting or recording moving images efficiently, there have been widely used coding apparatus for generating a coded stream of moving image data and decoding apparatus for decoding a coded stream to generate moving image data. Furthermore, as disclosed in NPLs 1 and 2, for example, HEVC (High Efficiency Video Coding, i.e., ITU-T H. 265 or ISO/IEC 23008-2) has been standardized as a moving image encoding process.

According to HEVC, a picture is divided into blocks called CTU (Coding Tree Unit). A CTU has a fixed block size of as many pixels as a multiple of 16 up to a maximum of 64×64 pixels. Each CTU is divided into coding units (CU) of a variable size on a quadtree basis. In case a CTU is not divided, the size of the CTU represents the largest size of a CU. A CU having a largest size is called a largest coding unit LCU (Largest Coding Unit), and a CU having a smallest size is called an SLU (Smallest Coding Unit). Each CU is divided into blocks called prediction units (PU) and blocks called transform units (TU). PUs and TUs are independently defined in a CU. According to HEVC, there is provided a transformation skip mode in which the prediction error for TUs is quantized while its orthogonal transforms are skipped for retaining sharp edges.

Moreover, according to PTL 1, the skipping of orthogonal transforms is selected on the basis of feature quantities representing characteristics of a prediction error.

CITATION LIST

Patent Literature

[PTL 1]
Japanese Patent Laid-Open No. 2014-131270
[NPL 1]
ITU-T Recommendation H.265: "High Efficiency Video Coding," 2013.
[NPL 2]
ISO/IEC 23008-2: "High Efficiency Video Coding," 2013.

SUMMARY

Technical Problems

Incidentally, in case a direct-current component (DC component) is included in residual data (predicted residual), when the residual data are quantized while skipping orthogonal transformation, the direct-current component may not be reproduced from the residual data after they have been dequantized. Furthermore, in the event that a DC shift is caused in the residual data by skipping orthogonal transformation, a discontinuity occurs at the block boundary between a TU where orthogonal transformation has been performed and a TU where orthogonal transformation has been skipped, with the result that the decoded image becomes an image of lowered image quality.

Therefore, the present technology provides an image processing apparatus and an image processing method that are capable of restraining a reduction in the image quality of decoded images.

Solution to Problems

According to a first aspect of the present technology, there is provided an image processing apparatus including:
a filter processing section that performs a filter process for an offset to pixels of a decoded image; and
a filter controller that inhibits the offset from being applied to an edge portion depending on occurrence of a transform unit in a transformation skip mode in which orthogonal transformation is not performed on a predicted residual.

According to the present technology, the filter controller inhibits the offset from being applied to an edge portion depending on the occurrence of a transform unit in a transformation skip mode in which orthogonal transformation is not performed on a predicted residual. For example, the filter controller inhibits the offset from being applied to the edge portion in case the transform unit in the transformation skip mode is included in a maximum coding unit. Furthermore, the filter controller may inhibit the offset from being applied to the edge portion in case the ratio of the number of transform units in the transformation skip mode to the number of transform units in a maximum coding unit is equal to or larger than a threshold value. Moreover, the filter controller may inhibit the offset from being applied to the edge portion in case the ratio of the number of pixels of transform units in the transformation skip mode to the number of pixels of a maximum coding unit is equal to or larger than a threshold value. Furthermore, the filter controller may set a weight depending on the size of the transform unit, and may inhibit the offset from being applied to the edge portion in case an evaluation value calculated using the number of transform units in the transformation skip mode in a maximum coding unit and the weight corresponding to the transform units in the transformation skip mode is equal to or larger than a threshold value. Moreover, the filter controller may inhibit the offset from being applied to the edge portion in case the decoded image includes an image having a high dynamic range. In addition, the filter controller may determine whether an offset for gradation adjustment using the decoded image is to be applied in the filter processing section or not, and may set an offset in case the offset is to be applied.

The image processing apparatus further includes a prediction selector that selects a predicted image of either an intra-prediction or an inter-prediction, in which the prediction selector selects the predicted image of the inter-prediction to calculate the predicted residual that indicates the difference with an image as a target to be coded in case the transformation skip mode is selected in an optimum mode in the inter-prediction, e.g., in case the transformation skip mode is selected in a transform unit of 4×4 pixels. In case the transformation skip mode is not selected is an optimum mode is the inter-prediction, the prediction selector selects the predicted image of either the intra-prediction or the inter-prediction on the basis of costs of the inter-prediction and the intra-prediction.

According to a second aspect of the present technology, there is provided an image processing method including:

performing a filter process for applying an offset to pixels of a decoded image; and inhibiting the offset from being applied to an edge portion depending on occurrence of a transform unit in a transformation skip mode in which orthogonal transformation is not performed on a predicted residual.

Advantageous Effect of Invention

According to the present technology, a filter process is performed to apply an offset to pixels of a decoded image. Furthermore, the offset is inhibited from being applied to an edge portion depending on the occurrence of a transform unit in a transformation skip mode in which orthogonal transformation is not performed on a predicted residual. Therefore, an offset for correcting a DC component is applied to a transform unit where orthogonal transformation is skipped, making less conspicuous the boundary between a transform unit where orthogonal transformation is performed and the transform unit where orthogonal transformation is skipped. The image quality of the decoded image is thus restrained from being lowered. The advantages described in the present description are only illustrative, but not limitative, with additional advantages being not precluded.

BRIEF DESCRIPTION OF DRAWINGS

FIG. 3 is a set of diagrams explaining an outline of an edge offset process.

FIG. 9 is a set of diagrams illustrating an operational example of the offset calculating operation.

FIG. 11 is a set of diagrams illustrating an operation in case an SAO process is performed on a decoded image of a TU in a transformation skip mode.

FIG. 12 is a set of diagrams illustrating a process in case an original image is an image of low range components.

FIG. 13 is a set of diagrams illustrating a process in case an original image is an image of middle-range components.

DESCRIPTION OF EMBODIMENTS

Modes for carrying out the present technology will hereinafter be described below. The description will be given in the following order:

1. Configuration and Operation in Case Image Processing Apparatus Performs Coding Process
   1-1. Configuration of Image Coding Apparatus
   1-2. Operation of Image Coding Apparatus
   1-3. Outline of Adaptive Offset Filter
   1-4. Configuration of Adaptive Offset Filter
   1-5. Adaptive Offset Filter Setting Operation
   1-6. Other Operation of Adaptive Offset Filter
   1-7. Other operation of Image Coding Apparatus
2. Configuration and Operation in Case Image Processing Apparatus Performs Decoding Process
   2-1. Configuration of Image Decoding Apparatus
   2-2. Operation of Image Decoding Apparatus
3. Application Examples 1. CONFIGURATION AND OPERATION IN CASE IMAGE PROCESSING APPARATUS PERFORMS CODING PROCESS The present technology is applicable to an image processing apparatus that performs a coding process for coding an image. The configuration and operation of an image coding apparatus to which the present technology is applied will be described below.

<1-1. Configuration of Image Coding Apparatus>

Figure 1:
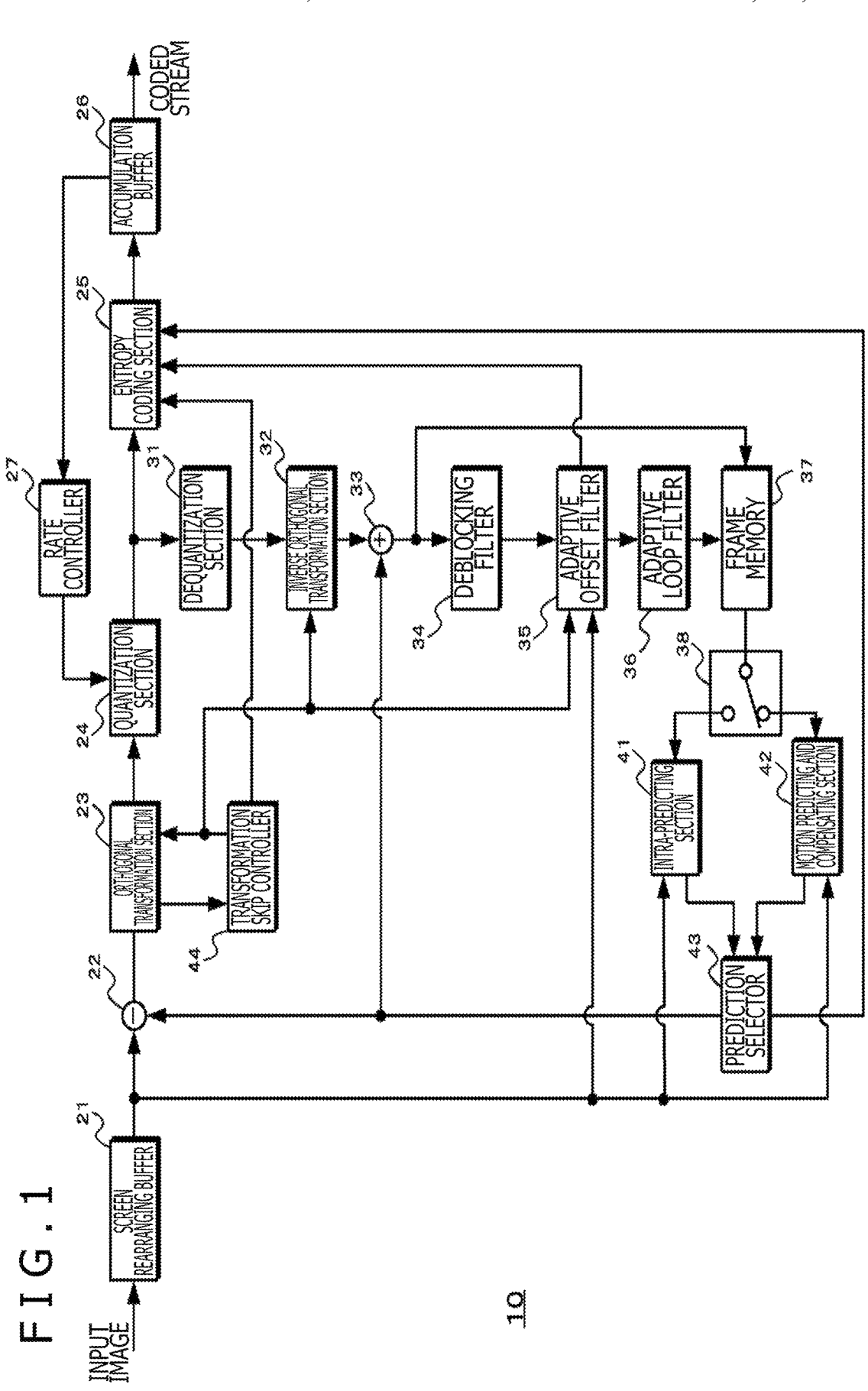
FIG. 1 is a diagram illustrating a configuration of an image coding apparatus.

FIG. 1 illustrates a configuration of an image coding apparatus. The image coding apparatus 10 codes image data using a prediction process, generating a coded stream according to HEVC, for example.

The image coding apparatus 10 has a screen rearranging buffer 21, an operator 22, an orthogonal transformation section 23, a quantization section 24, an entropy coding section 25, an accumulation buffer 26, and a rate controller 27. In addition, the image coding apparatus 10 has a dequantization section 31, an inverse orthogonal transformation section 32, an operator 33, a deblocking filter 34, an adaptive offset filter 35, an adaptive loop filter 36, a frame memory 37, and a selector 38. Moreover, the image coding apparatus 10 has an intra-predicting section 41, a motion predicting and compensating section 42, a prediction selector 43, and a transformation skip controller 44.

The screen rearranging buffer 21 rearranges stored frame images in a display order into frame images in an order for cording, i.e., a coding order, depending on a GOP (Group Of Picture) structure. The screen rearranging buffer 21 outputs image data of the frame images in the coding order (original image data) to the operator 22. Furthermore, the screen rearranging buffer 21 outputs the original image data to the adaptive offset filter 35, the intra-predicting section 41, and the motion predicting and compensating section 42.

The operator 22 subtracts prediction image data supplied from the intra-predicting section 41 or the motion predicting and compensating section 42 through the prediction selector 43 from the original image data supplied from the screen rearranging buffer 21 per pixel, and outputs residual data representing prediction residuals to the orthogonal transformation section 23.

In the case of an image to be intra-coded, for example, the operator 22 subtracts prediction image data generated by the intra-predicting section 41 from the original image data. Moreover, in the case of an image to be inter-coded, for example, the operator 22 subtracts image data generated by the motion predicting and compensating section 42 from the original image data.

The orthogonal transformation section 23 performs an orthogonal transformation process that carries out an orthogonal transform such as a discrete cosine transform, a Karhunen-Loeve transformation, or the like, or a transformation skip process that skips the orthogonal transformation process, on the residual data supplied from the operator 22 on the basis of a control signal from the transformation skip controller 44. The orthogonal transformation section 23 outputs a transform coefficient obtained by the orthogonal transformation process to the quantization section 24. Alternatively, the orthogonal transformation section 23 outputs a transformation skip coefficient obtained by the transformation skip process to the quantization section 24.

The quantization section 24 quantizes a transform coefficient or a transformation skip coefficient output from the orthogonal transformation section 23. The quantization section 24 outputs the quantized data of the transform coefficient or the transformation skip coefficient to the entropy coding section 25. Furthermore, the quantization section 24 also outputs the generated quantized data to the dequantization section 31.

The entropy coding section 25 performs an entropy coding process such as arithmetic coding or the like, e.g., an entropy coding process according to CABAC (Context-Adaptive Binary Arithmetic Coding) on the quantized data. Furthermore, the entropy coding section 25 acquires a parameter of a prediction mode selected by the prediction selector 43, e.g., a parameter such as information representing an intra-prediction mode or a parameter such as information representing an inter prediction mode or motion vector information. Moreover, the entropy coding section 25 acquires a parameter relating to a filter process from the adaptive offset filter 35 to be described later. The entropy coding section 25 codes the quantized data and codes each acquired parameter (syntax element), and accumulates them as part of header information (multiplexes them) in the accumulation buffer 26.

The accumulation buffer 26 temporarily retains the data supplied from the entropy coding section 25, and outputs the accumulated data as a coded image at a predetermined timing as a coded stream to a recording device, a transmission path, or the like, not depicted, in a later stage, for example.

The rate controller 27 controls the rate of quantizing operation of the quantization section 24 on the basis of the compressed image accumulated in the accumulation buffer 26 in order to prevent as overflow or an underflow from occurring.

The dequantization section 31 dequantizes the quantized data of the transform coefficient or the transformation skip coefficient supplied from the quantization section 24 according to a process corresponding to the quantization performed by the quantization section 24. The dequantization section 31 outputs obtained dequantized data to the inverse orthogonal transformation section 32.

The inverse orthogonal transformation section 32 performs an inverse orthogonal transformation on the supplied dequantized data according to a process corresponding to the orthogonal transformation process performed by the orthogonal transformation section 23. The inverse orthogonal transformation section 32 outputs the result of the orthogonal transformation, i.e., the restored residual data, to the operator 33. Moreover, in case the dequantized data represent the transformation skip coefficient on the basis of transformation skip information from the transformation skip controller 44, the inverse orthogonal transformation section 32 skips an inverse orthogonal transformation and outputs the dequantized data, i.e., the restored residual data, to the operator 33.

The operator 33 adds predicted image data supplied from the intra-predicting section 41 or the motion predicting and compensating section 42 via the prediction selector 43 to the residual data supplied from the inverse orthogonal transformation section 32, obtaining a locally decoded image (a decoded image). For example, in case the residual data correspond to an image to be intra-coded, the operator 33 adds predicted image data supplied from the intra-predicting section 41 to the residual data. Furthermore, for example, in case residual data correspond to an image to be inter-coded, the operator 33 adds predicted image data supplied from the motion predicting and compensating section 42 to the residual data. The decoded image data represented by the result of the addition are output to the deblocking filter 34. The decoded image data are also output as reference image data to the frame memory 37.

The deblocking filter 34 removes a block distortion from the decoded image data by performing an appropriate deblocking filter process thereon. The deblocking filter 34 outputs the result of the filter process to the adaptive offset filter 35.

The adaptive offset filter 35 performs an adaptive offset filter process, hereinafter referred to as "SAO (Sample Adaptive Offset) process," on the decoded image data filtered by the deblocking filter 34. Incidentally, details of the SAO process will be described later. The adaptive offset filter 35 outputs an image processed by the SAO process to the adaptive loop filter 36.

In addition, the adaptive offset filter 35 sets the SAO process depending on the usage of a transformation skip mode that is a mode for performing the transformation skip process on the basis of the transformation skip information from the transformation skip controller 44 to be described later, for suppressing effects caused by using the transformation skip mode. Incidentally, details will be described later. Moreover, the adaptive offset filter 35 outputs information with respect to the SAO process to be performed on the decoded image data supplied from the deblocking filter 34 as a parameter to the entropy coding section 25.

The adaptive loop filter 36 is arranged as a two-dimensional Wienner Filter or the like, for example, and performs an adaptive loop filter (ALF), process on each LCU (corresponding to a CTU). The adaptive loop filter 36 outputs the filtered decoded image data as reference image data to the frame memory 37.

The reference image data stored in the frame memory 37 are output at a predetermined timing through the selector 38 to the intra-predicting section 41 or the motion predicting and compensating section 42. In the case of images to be intra-coded, for example, the reference image data that have not been filtered by the deblocking filter 34 or the like are read from the frame memory 37 and output through the selector 38 to the intra-predicting section 41. Furthermore, in the case of images to be inter-coded, for example, the reference image data that have been filtered by the deblocking filter 34 or the like are read from the frame memory 37 and output through the selector 38 to the motion predicting and compensating section 42.

The intra-predicting section 41 performs an intra-prediction (an in-screen prediction), for generating a predicted image using pixel values in the screen. The intra-predicting section 41 generates predicted image data in each of all intra-prediction modes, using the decoded image data generated by the operator 33 and stored as reference image data in the frame memory 37. Moreover, the intra-predicting section 41 calculates the cost of each intra-prediction mode (e.g., a rate distortion cost) using the original image data supplied from the screen rearranging buffer 21 and the predicted image data, and selects an optimum mode in which the calculated cost is minimum. After having selected an optimum intra-prediction mode, the intra-predicting section 41 outputs the predicted image data in the selected intra-prediction mode, a parameter such as intra-prediction mode information, etc. representing the selected intra-prediction mode, the cost, etc. to the prediction selector 43.

The motion predicting and compensating section 42 performs a motion prediction on an image to be inter-coded using the original image data supplied from the screen rearranging buffer 21 and the decoded image data filtered and stored as reference image data in the frame memory 37. Moreover, the motion predicting and compensating section 42 performs a motion compensation process depending on a motion vector detected by the motion prediction, generating predicted image data.

The motion predicting and compensating section 42 performs an inter-prediction process in all inter prediction modes as candidates, generates predicted image data in each of all intra-prediction modes, calculates a cost, e.g., a rate distortion cost, and selects an optimum mode in which the calculated cost is minimum. After having selected an optimum inter-prediction mode, the motion predicting and compensating section 42 outputs the predicted image data in the selected inter prediction mode, parameters such as inter-prediction mode information representing the employed inter-prediction mode and motion vector information representing a calculated motion vector, the cost, etc. to the prediction selector 43.

The prediction selector 43 selects an optimum prediction process on the basis of the costs of the intra-prediction mode and the inter-prediction mode. In case an intra-prediction process is selected, the prediction selector 43 outputs the predicted image data supplied from the intra-predicting section 41 to the operator 22 and the operator 33, and outputs the parameter such as the intra-prediction mode information, etc. to the entropy coding section 25. In case an intra-prediction process is selected, the prediction selector 43 outputs the predicted image data supplied from the motion predicting and compensating section 42 to the operator 22 and the operator 33, and outputs the parameters such as the inter-prediction mode information and the motion vector information, etc. to the entropy coding section 25.

In case the image coding apparatus 10 is set in its operation not to use the transformation skip mode, the transformation skip controller 44 causes the orthogonal transformation section 23 to perform an orthogonal transformation process residual data in each TU and output an obtained transform coefficient to the quantization section 24. Furthermore, the transformation skip controller 44 causes the inverse orthogonal transformation section 32 to perform an inverse orthogonal transformation on a dequantized transform coefficient and output obtained residual data to the operator 33.

In case the image coding apparatus 10 is set in its operation to be able to use the transformation skip mode, the transformation skip controller 44 determines whether the transformation skip mode is set for each TU or not. The transformation skip controller 44 calculates an evaluation function value at the time the transformation skip process and the orthogonal transformation process, for example, are carried out for each TU, and determines whether the transformation skip mode is set or not on the basis of the calculated evaluation function value. The amount of data after the transformation skip process and the amount of data after the orthogonal transformation process are used as the evaluation function value. In this case, if the amount of data after the transformation skip process is equal to or smaller than the amount of data after the orthogonal transformation process, then the transformation skip mode is set. Moreover, costs, e.g., rate distortion costs, in case the transformation skip process is carried out and in case the orthogonal transformation process is carried out may be used as the evaluation function value. In this case, if the cost of the transformation skip process is equal to or smaller than the cost of the orthogonal transformation process, then the transformation skip mode is set. Incidentally, another function value may be used as the evaluation function value.

The transformation skip controller 44 performs the transformation skip process with respect to TUs for which the transformation skip mode is set. In the transformation skip process, the orthogonal transformation process is skipped and the residual data are output to the quantization section 24. The transformation skip controller 44 controls the orthogonal transformation section 23 to output the transform coefficient after the orthogonal transformation process to the quantization section 24 with respect to other TUs for which the transformation skip mode is not set. Furthermore, with respect to TUs for which the transformation skip mode is set, the transformation skip controller 44 outputs the dequantized data (corresponding to residual data) obtained by the dequantization section 31 to the operator 33 without the inverse orthogonal transformation section 2 performing an inverse orthogonal transformation on them. Moreover, with respect to the other TUs, the transformation skip controller 44 causes the inverse orthogonal transformation section 2 to perform an inverse orthogonal transformation on the dequantized data (corresponding to the transform coefficient) obtained by the dequantization section 31, and output the inverse orthogonal transform data to the operator 33. Incidentally, in the transformation skip process, the transformation skip controller 44 performs a bit shift process such that the norm of the transformation skip coefficient (corresponding to residual data) after the transformation skip process matches the norm of the transform coefficient. In this case, in addition, the transformation skip controller 44 processes the residual data obtained by the dequantization by the dequantization section 31 according to a process inverse to the bit shift process that causes the norm of the transformation skip coefficient to match the normal of the transform coefficient, and outputs the processed residual data to the operator 33. Moreover, the transformation skip controller 44 generates transformation skip information that represents information relating to TUs in which the transformation skip mode is set in an LCU (corresponding to a CTU), and outputs the generated transformation skip information to the adaptive offset filter 35.

<1-2. Operation of Image Coding Apparatus>

Figure 2:
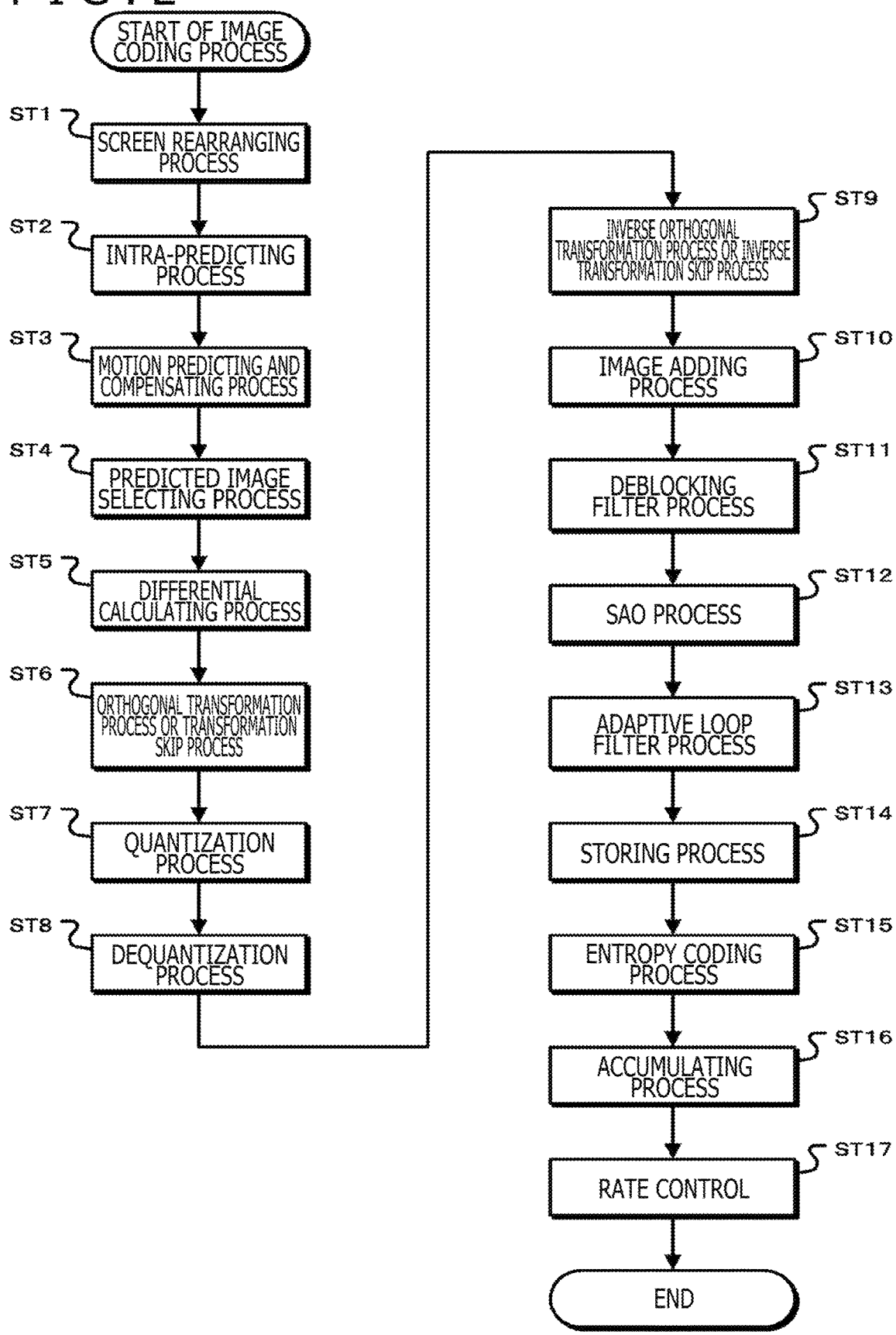
FIG. 2 is a flowchart illustrating an operation sequence of the image coding apparatus.

Next, operation of the image coding apparatus will be described below. FIG. 2 is a flowchart illustrating operation of the image coding apparatus.

In step ST1, the image coding apparatus performs a screen rearranging process. The screen rearranging buffer 21 of the image coding apparatus 10 rearranges frame images in a display order into frame images in a coding order, and outputs the rearranged frame images to the intra-predicting section 41, the motion predicting and compensating section 42, and the adaptive offset filter 35.

In step ST2, the image coding apparatus performs an intra-prediction process. The intra-predicting section 41 of the image coding apparatus 10 generates predicted image data by intra-predicting pixels of a block to be processed in all intra-prediction modes as candidates, using the reference image data read from the frame memory 37. Furthermore, the intra-predicting section 41 calculates costs using the generated predicted image data and the original image data. The decoded image data that are not filtered by the deblocking filter 34, etc. are used as the reference image data. On the basis of the calculated costs, the intra-predicting section 41 selects an optimum intra-prediction mode, and outputs predicted image data, a parameter, and a cost generated by the intra-prediction in the optimum intra-prediction mode to the prediction selector 43.

In step ST3, the image coding apparatus performs a motion predicting and compensating process. The motion predicting and compensating section 42 of the image coding apparatus 10 generates a predicted image by inter-predicting pixels of a block to be processed in all inter-prediction modes as candidates. Furthermore, the motion predicting and compensating section 42 calculates costs using the generated predicted image data and the original image data. The decoded image data that are filtered by the deblocking filter 34, etc. are used as the reference image data. On the basis of the calculated costs, the motion predicting and compensating section 42 selects an optimum inter-prediction mode, and outputs a predicted image data, a parameter, and a cost generated in the optimum inter-prediction mode to the prediction selector 43.

In step ST4, the image coding apparatus performs a predicted image selecting process. The prediction selector 43 of the image coding apparatus 10 determines one of an optimum intra-prediction mode and an optimum inter-prediction mode as an optimum prediction mode on the basis of the costs calculated in step ST2 and step ST3. Then, the prediction selector 43 selects the predicted image data in the determined optimum prediction mode and outputs the selected predicted image data to the operators 22 and 33. Incidentally, the predicted image data will be used in the arithmetic operations of steps ST5 and ST10. Furthermore, the prediction selector 43 outputs a parameter relating to the optimum prediction mode to the entropy coding section 25.

In step ST5, the image coding apparatus performs a differential calculating process. The operator 22 of the image coding apparatus 10 calculates the difference between the original image data rearranged in step ST1 and the predicted image data selected in step ST4, and outputs residual data represented by the differential result to the orthogonal transformation section 23.

In step ST6, the image coding apparatus performs an orthogonal transformation process or a transformation skip process. The orthogonal transformation section 23 of the image coding apparatus 10 orthogonally transforms the residual data supplied from the operator 22. Specifically, the orthogonal transformation section 23 performs an orthogonal transformation such as a discrete cosine transformation, a Karhunen-Loeve transformation, or the like, on the residual data and outputs an obtained transform coefficient to the quantization section 24. Furthermore, in the case of the transformation skip mode, the orthogonal transformation section 23 performs a transformation skip process and outputs the residual data to the quantization section 24 without orthogonally transforming the residual data. Incidentally, in the transformation skip process, the orthogonal transformation section 23 performs a bit shift process such that the norm of the transformation skip coefficient matches the norm of the transform coefficient, as described above.

In step ST7, the image coding apparatus performs a quantizing process. The quantization section 24 of the image coding apparatus 10 quantizes the transform coefficient or the residual data supplied from the orthogonal transformation section 23. For the quantization, the rate is controlled as will be described with respect to the processing of step ST17 to be described later.

The quantized information generated as described hereinbefore is locally decoded in the manner described below. Specifically, in step ST8, the image coding apparatus performs a dequantizing process. The dequantization section 31 of the image coding apparatus 10 dequantizes the quantized data output from the quantization section 24 according to characteristics corresponding to the quantization section 24.

In step ST9, the image coding apparatus performs an inverse orthogonal transformation process or an inverse transformation skip process. The inverse orthogonal transformation section 32 of the image coding apparatus 10 inversely orthogonally transforms the dequantized data generated by the dequantization section 31 according to characteristics corresponding to the orthogonal transformation section 23, and outputs the inversely orthogonally transform data to the operator 33. Furthermore, in case the transformation skip mode is used in the orthogonal transformation section 23, the inverse orthogonal transformation section 32 skips an inverse orthogonal transformation on the dequantized data, thereafter performs an inverse bit shift process thereon, and outputs the processed data to the operator 33.

In step ST10, the image coding apparatus performs an image adding process. The operator 33 of the image coding apparatus 10 adds the predicted image data output from the prediction selector 43 to the locally decoded residual data, generating a locally decoded image (specifically, locally decoded).

In step ST11, the image coding apparatus performs a deblocking filter process. The deblocking filter 34 of the image coding apparatus 10 performs a deblocking filter process on the image output from the operator 33, removing a block distortion therefrom, and outputs the image to the adaptive offset filter 35.

In step ST12, the image coding apparatus performs an SAO process. The adaptive offset filter 35 of the image coding apparatus 10 performs an SAO process on the image output from the deblocking filter 34. According to the SAO process, the type of the SAO process and a coefficient are determined for each LCU, which is a maximum coding unit, and the filter process is carried out using them. In addition, the adaptive offset filter 35 limits filter operation with respect to an image in the transformation skip mode. Incidentally, details of this SAO process will be described later. Moreover, the adaptive offset filter 35 outputs a parameter relating to the SAO process to the entropy coding section 25, and will be coded in step ST15 as described later.

In step ST13, the image coding apparatus performs an adaptive loop filter process. The adaptive loop filter 36 of the image coding apparatus 10 performs an adaptive loop filter process on the image filtered by the adaptive offset filter 35. For example, the filter process is carried out on the image filtered by the adaptive offset filter 35 for each LCU, using a filter coefficient, and the result of the filter process is stored in the frame memory 37.

In step ST14, the image coding apparatus performs a storing process. The frame memory 37 of the image coding apparatus 10 stores therein the image before it is filtered by the deblocking filter 34, etc. and the image after it is filtered by the deblocking filter 34, etc.

On the other hand, the transform coefficient or the residual data quantized in step ST7 described above is also output to the entropy coding section 25. In step ST15, the image coding apparatus performs an entropy coding process. The entropy coding section 25 of the image coding apparatus 10 codes the quantized transform coefficient or the quantized residual data output from the quantization section 24, and the supplied parameters.

In step ST16, the image coding apparatus performs an accumulating process. The accumulation buffer 26 of the image coding apparatus 10 accumulates the coded data. The coded data accumulated in the accumulation buffer 26 are appropriately read and transmitted to a decoding side through a transmission path or the like.

In step ST17, the image coding apparatus performs rate control. The rate controller 27 of the image coding apparatus 10 controls the rate of quantizing operation of the quantization section 24 to prevent the coded data accumulated in the accumulation buffer 26 from causing an overflow or an underflow.

<1-3. Outline of Adaptive Offset Filter Process>

Next, the outline of the adaptive offset filter process will be described below. The adaptive offset filter process (the SAO process), is available in two kinds called "edge offset" (EO) and "band offset" (BO), and a parameter is set for each LCU (Largest Coding Unit).

The edge offset refers to a process for adding an offset value to or subtracting an offset value from the pixel value of each pixel depending on the relative relationship between a pixel to be processed and two adjacent pixels that are adjacent to the pixel.

For example, FIG. 3 is a set of diagrams explaining an outline of an edge offset process. EO_0 through EO_3 illustrated in (a) of FIG. 3 represent candidates (classes) for a pixel array in the edge offset process. In FIG. 3, a pixel c is illustrated as a target pixel to be processed, and pixels a and b are illustrated as adjacent pixels to the target pixel c. Which one of the classes EO_0 through EO_3 is to be used can be selected for each LCU with respect to both luminance and color difference according to parameters "sao_eo_class_luma" and "sao_eo_class_chroma."

An absolute value "sao_offset_abs" of an offset is given to each of four categories determined by the relative relationship between the target pixel and the adjacent pixels in a selected class. Categories 1 through 4 illustrated in (b) of FIG. 3 represent classifications of the relationships between the pixel values of the target pixel c, the adjacent pixel a, and the adjacent pixel b. For example, the category 1 indicates that the pixel value of the target pixel c is smaller than the pixel value of either one of the adjacent pixel a and the adjacent pixel b. The category 2 indicates that the pixel value of the target pixel c is smaller than the pixel value of one of the adjacent pixel a and the adjacent pixel b and equal to the pixel value of the other. In the cases of the categories 1 and 2, an offset is added to the target pixel c for smoothing of the pixel values of the target pixel c, the adjacent pixel a, and the adjacent pixel b.

The category 3 indicates that the pixel value of the target pixel c is larger than the pixel value of one of the adjacent pixel a and the adjacent pixel b and equal to the pixel value of the other. The category 4 indicates that the pixel value of the target pixel c is larger than the pixel value of either one of the adjacent pixel a and the adjacent pixel b. In the cases of the categories 3 and 4, an offset is subtracted from the target pixel c for smoothing of the pixel values of the target pixel c, the adjacent pixel a, and the adjacent pixel b.

According to the edge offset process, a category 0 indicating that no edge offset process is performed is included in addition to the categories 1 through 4 described above.

According to the edge offset process, one of the classes EO_0 through EO_3 is selected, and it is specified which one of the categories 0 through 4 the relationship between the pixel values of the target pixel c, the adjacent pixel a, and the adjacent pixel b in the selected class corresponds to. Then, depending on the category which the relationship corresponds to, a smoothing process is performed on the pixel array by adding or subtracting an offset. Consequently, the adaptive offset filter 35 can restrain ringing, for example, by performing the edge offset process.

According to a band offset process, the gradation of a pixel value (i.e., ranging from 0 to a maximum value available depending on a bit depth) is divided into 32 bands, and the pixel values of pixels belonging to four successive bands among the 32 bands are changed by (adding or subtracting) an offset value that is set for each of the bands. Therefore, the adaptive offset filter 35 can reduce gradation errors, for example, by performing the band offset process.

Figure 4:
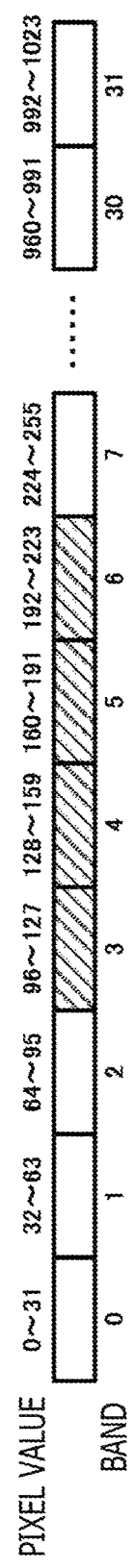
FIG. 4 is a diagram explaining an outline of a band offset process.

FIG. 4 is a diagram explaining an outline of the band offset process, where the bit depth is of 10 bits. According to basic profiles (Main, Main10, Main Still) of H.265/HEVC, 8 bits (pixel values range from 0 to 255) through 10 bits (pixel values range from 0 to 1023) can be used as bit depths of pixels (only 8 bits can be used according to Main, Main Still). Specifically, in the example illustrated in FIG. 10 where the bit depth is of 10 bits, the pixel values 0 through 1023 are divided into 32 bands, and four bands 3 through 6 among the divided bands 0 through 31 are selected. According to the band offset process, an operation in which no band offset process is performed is also stipulated.

<1-4. Configuration of Adaptive Offset Filter>

Figure 5:
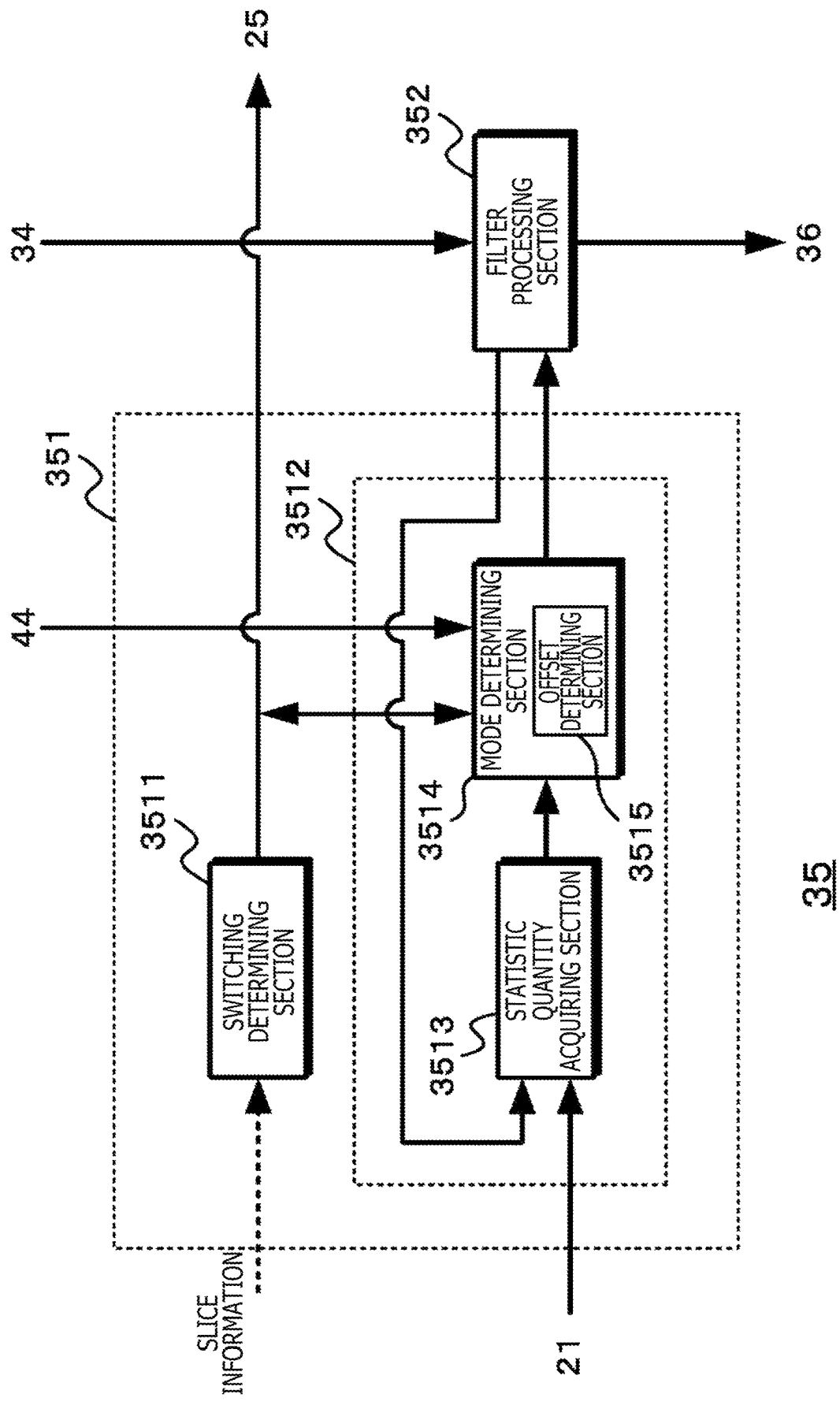
FIG. 5 is a diagram illustrating a configuration of an adaptive offset filter.

Next, the configuration of the adaptive offset filter will be described below. FIG. 5 illustrates the configuration of the adaptive offset filter. The adaptive offset filter 35 has a filter controller 351 and a filter processing section 352. The filter controller 351 has a switching determining section 3511 and an analyzing section 3512.

The switching determining section 3511 determines whether the SAO process is to be applied or not with respect to each of luminance and chromaticity for each slice as a target to be processed, and controls operation of the analyzing section 3512 on the basis of the determined result.

Specifically, in case a slice as a target to be processed is either an I slice or a P slice, the switching determining section 3511 instructs the analyzing section 3512 to apply the SAO process to the slice.

Moreover, in case a slice as a target to be processed is a B slice, the switching deter fining section 3511 determines whether the SAO process is to be applied to the B slice or not depending on the number (the number of modes) of LCUs (corresponding to CTU) to which the SAO process has been applied in a slice preceding the B slice (i.e., an I slice or a P slice).

According to a specific example, in case the number of modes is equal to or larger than a predetermined threshold value Ths (e.g., half the number or larger) in a preceding slice, the switching determining section 3511 instructs the analyzing section 3512 to apply the SAO process to the B slice as the target to be processed. On the other hand, in case the number of modes is smaller than the predetermined threshold value Ths in a preceding slice, the switching determining section 3511 instructs the analyzing section 3512 to limit the application of the SAO process (i.e., not to apply the SAO process) to the B slice as the target to be processed.

Furthermore, the switching determining section 3511 outputs whether the SAO process to be applied or not per slice as a parameter to the entropy coding section 25. One example of a parameter for controlling whether the SAO process as to be applied or not per slice may be "slice_sao_luma_flag" corresponding to luminance and "slice_sao_chroma_flag" corresponding to chromaticity.

The analyzing section 3512 includes a statistic quantity acquiring section 3513 and a mode determining section 3514. The analyzing section 3512 determines a mode and an offset value of the SAO process for each LCU on the basis of the original image data output from the screen rearranging buffer 21 and the decoded image data output from the deblocking filter 34.

The statistic quantity acquiring section 3513 calculates statistic quantities for specifying a mode and an offset value of the SAO process on the basis of the original image data and the decoded image data.

According to a specific example, the statistic quantity acquiring section 3513 analyzes the corresponding relationship between a target pixel and adjacent pixels in each of the classes EO_0 through EO_3 of the edge offset illustrated in FIG. 3 in terms of the pixels in the decoded image data, and calculates the frequency of appearance of each of the categories 0 through 4. Moreover, at this time, the statistic quantity acquiring section 3513 accumulates the differences between the pixel values of the decoded image data and the original image data for each of the calculated categories. Then, the statistic quantity acquiring section 3513 uses the frequency of appearance of each of the categories 0 through 4 calculated with respect to each of the classes EO_0 through EO_3 and the pixel values accumulated for each of the categories, as statistic quantities.

In addition, the statistic quantity acquiring section 3513 calculates the frequency of a corresponding pixel in each of the bands 0 through 31 of the hand offset illustrated in FIG. 4, and accumulates the differences between the pixel values of the decoded image data and the original image data for the pixel. Then, the statistic quantity acquiring section 3513 uses the frequency calculated for each band and the differences between the pixel values accumulated for each band, as statistic quantities. The statistic quantity acquiring section 3513 outputs the calculated statistic quantities to the mode determining section 3514.

The mode determining section 3514 specifies a mode of the SAO process for each LCU and an offset value of the mode on the basis of the determined result from the switching determining section 3511, the transformation skip information supplied from the transformation skip controller 44, and the statistic quantities supplied from the statistic quantity acquiring section 3513.

In case it is indicated by the determined result from the switching determining section 3511, i.e., "slice_sao_luma_flag" corresponding to luminance and "slice_sao_chroma_flag" corresponding to chromaticity, that the SAO process is not to be applied, the mode determining section 3514 specifies a mode so as not to perform the SAO process. Moreover, in case it is indicated by the determined result from the switching determining section 3511 that the SAO process is to be applied, the mode determining section 3514 specifies a mode of the SAO process and an offset value in the mode on the basis of the transformation skip information supplied from the transformation skip controller 44 and the statistic quantities supplied from the statistic quantity acquiring section 3513.

An offset determining section 3515 of the mode determining section 3514 calculates an offset value and a cost (e.g., a rate distortion cost) corresponding to the offset value with respect to both the edge offset and the band offset, or with respect to only the band offset with the edge offset being inhibited, on the basis of the transformation skip information and the statistic quantities. The offset determining section 3515 calculates an offset value and a cost corresponding to the offset value with respect to each of combinations of the classes of the edge offset and the categories 1 through 4. Moreover, the offset determining section 3515 calculates an offset value and a cost corresponding to the offset value with respect to the band offset. Furthermore, the offset determining section 3515 calculates a cost in case the SAO process is not to be applied.

The mode determining section 3514 compares the costs calculated by the offset determining section 3515 and specifies, for each LCU, a mode of the SAO process capable of maximizing the coding efficiency and an offset value corresponding to the mode, on the basis of the result of the comparison. Moreover, the mode determining section 3514 outputs the mode specified for each LCU and the offset value corresponding to the mode to the filter processing section 352.

Furthermore, the mode determining section 3514 outputs the mode of the SAO process specified for each LCU and the offset value, or the information that the SAO process is not to be applied, as parameters to the entropy coding section 25. Incidentally, the mode determining section 3514 outputs "sao_type_idx_lume" corresponding to luminance and "sao_ type_idx_chroma" corresponding to chromaticity as a parameter indicating either the edge offset or the band offset, for example. Moreover, in case the edge offset is applied, the mode determining section 3514 outputs "sao_eo_class_lume" corresponding to luminance and "sao_eo_class_chroma" corresponding to chromaticity as a parameter indicating the class of the edge offset. Moreover, in case the band offset is applied, the mode determining section

3514 outputs "sao_band_position" as a parameter indicating the position of the band. Furthermore, the mode determining section 3514 outputs "sao_offset_abs" indicating the absolute value of an offset value and "sao_offset_sign" indicating the positive or negative of the offset value as a parameter for informing the offset value.

The filter processing section 352 performs a filter process on each LCU of the decoded image data on the basis of the mode of the SAO process and the offset value supplied from the analyzing section 3512. Incidentally, in case it is indicated by the analyzing section 3512 that the SAO process is not to be applied, the filter processing section 352 performs no SAO process on a target LCU. The filter processing section 352 outputs decoded image data processed by the SAO process or not processed by the SAO process to the adaptive loop filter 36.

<1-5. Adaptive Offset Filter Setting Operation>

Next, adaptive offset filter setting operation will be described below. The adaptive offset filter 35 determines whether or not the SAO process for a slice as a target to be processed is to be turned on. In case a slice as a target to be processed is either an I slice or a P slice, the adaptive offset filter 35 turns on the SAO process. In case a slice as a target to be processed is a B slice, the adaptive offset filter 35 turns on the SAO process when the number of modes in a slice preceding the B slice is equal to or larger than the predetermined threshold value Ths, and turns off the SAO process when the number of modes is smaller than the threshold value Ths. Moreover, the adaptive offset filter 35 may turn on or off the SAO process according to an instruction from the user or the like.

Figure 6:
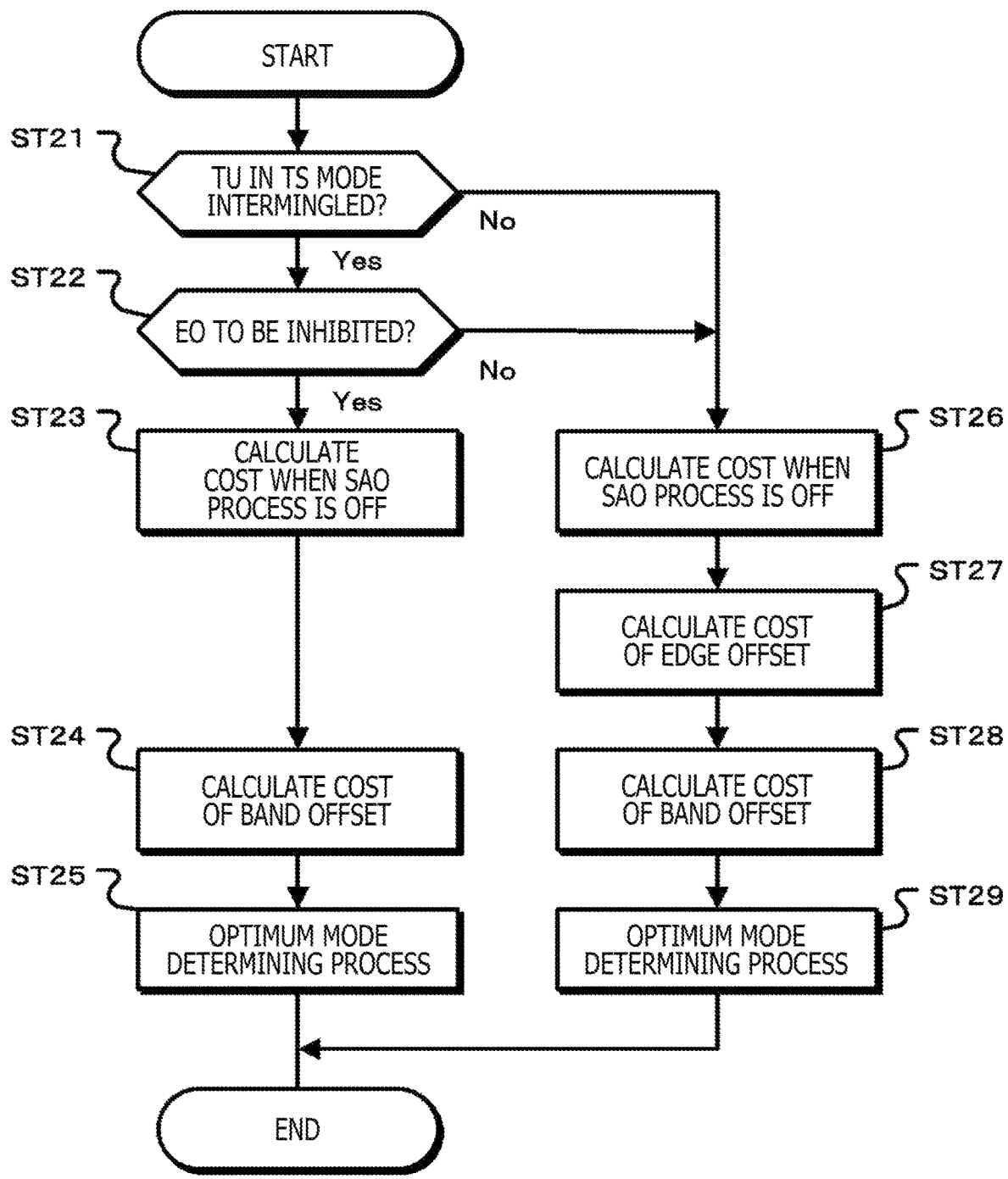
FIG. 6 is a flowchart illustrating an adaptive offset filter setting operation sequence.

In case the adaptive offset filter 35 turns on the SAO process, the adaptive offset filter 35 performs adaptive offset filter setting operation illustrated in FIG. 6.

In step ST21, the adaptive offset filter determines whether or not a TU in the transformation skip mode (TS mode) is intermingled. The adaptive offset filter 35 determines whether or not a TU in the transformation skip mode is intermingled in a LCU on the basis of the transformation skip information from the transformation skip controller 44. In case a TU to be orthogonally transformed and a TU in the transformation skip mode are intermingled in a LCU, the adaptive offset filter 35 goes to step ST22. In case they are not intermingled in a LCU, the adaptive offset filter 35 goes to step ST26.

Figure 7:
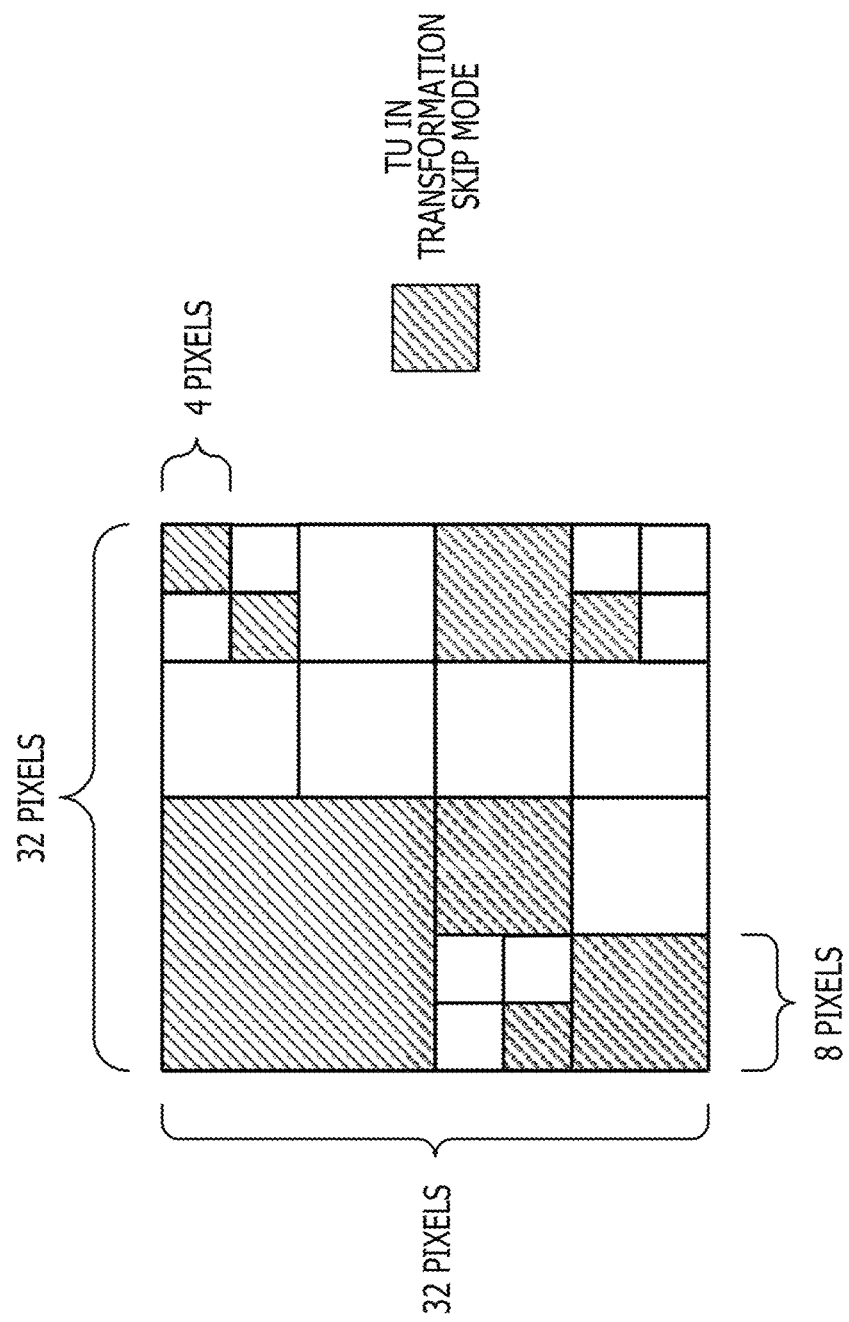
FIG. 7 is a diagram illustrating TUs in a transformation skip mode that are included in an LCU as a target to be processed.

In step ST22, the adaptive offset filter determines whether or not the edge offset is to be inhibited (EO to be inhibited). The adaptive offset filter 35 determines whether or not EO is to be inhibited on the basis of the transformation skip information from the transformation skip controller 44. FIG. 7 illustrates TUs in the transformation skip mode that are included in an LCU as a target to be processed. For example, it is indicated by the transformation skip information that there are 22 TUs included in the LCU as the target to be processed, 8 TUs in the transformation skip mode, 3 TUs of 8×8 pixels, and 4 TUs of 4×4 pixels.

The adaptive offset filter 35 performs a first determining operation in which it decides that EO is to be inhibited in case a TU in the transformation skip mode is included in the LCU as the target to be processed, and that EO is not to be inhibited in case no TU is included.

The adaptive offset filter 35 may perform a second determining operation different from the first determining operation. For example, the adaptive offset filter 35 determines whether or not EO is to be inhibited on the basis of the ratio of the number of Iris in the transformation skip mode included in the LCU as the target to be processed. In the case of FIG. 7, since there are 22 TUs included in the LCU as the target to be processed and 8 TUs in the transformation skip mode, the ratio of the number is 0.367 (=8/22). In case the ratio of the number is equal to or larger than a preset threshold value, the adaptive offset filter 35 decides that EO is to be inhibited. In case the ratio of the number is smaller than the threshold value, the adaptive offset filter 35 decides that EO is not to be inhibited.

Furthermore, the adaptive offset filter 35 may perform a third determining operation different from the first and second determining operations. For example, the adaptive offset filter 35 determines whether or not EO is to be inhibited on the basis of the number of pixels (area) of TUs in the transformation skip mode included in the LCU as the target to be processed. In the case of FIG. 7, in case the TUs in the transformation skip mode are of 512 pixels and the number of pixels of the TUs in the transformation skip mode is equal to or larger than a preset threshold value, the adaptive offset filter 35 decides that EO is to be inhibited. In case the number of pixels is smaller than the threshold value, the adaptive offset filter 35 decides that EO is not to be inhibited.

Moreover, the adaptive offset filter 35 may perform a fourth determining operation different from the first through third determining operations. In the fourth determining operation, the adaptive offset filter 35 sets a weight for each of the sizes of TUs in the transformation skip mode, making it easy to decide that EO is to be inhibited in case there is a large-size TU in the transformation skip mode.

For example, if the weight for a TU whose size is 4×4 pixels is "WT_4×4," the weight for a TU whose size is 8×8 pixels is "WT_8×8," and the weight for a TU whose size is 16×16 pixels is "WT_16×16," then the ratio of the numbers RBW after being weighted for the case of FIG. 7 is given by the equation (1) below.

$$RBW = 4 \times WT\_4 \times 4 + 3 \times WT\_8 \times 8 + 1 \times WT\_16 \times 16 \tag{1}$$

Here, as a DC shift tends to be conspicuous in a large-size TU, if the weight is set to "WT_4×4<WT_8×8<WT_16×16," then it is easy to decide that EO is to be inhibited in case a large-size TU is included in TUs in the transformation skip mode.

The adaptive offset filter 35 performs either one of the first through fourth determining operations. In case the adaptive offset filter 35 decides that EO is to be inhibited, it goes to step ST23. In the adaptive offset filter 35 decides that EO is not to be inhibited, it goes to step ST26. Incidentally, the adaptive offset filter 35 may be set in advance to perform either one of the first through fourth determining operations, or the user may instruct the adaptive offset filter 35 to perform either one of the first through fourth determining operations. Furthermore, the adaptive offset filter 335 may be arranged to be able to switch between a plurality of determining operations among the first through fourth determining operations.

In step ST23, the adaptive offset filter calculates a cost in case the SAO process is turned off. The adaptive offset filter 35 calculates a cost in case the SAO process is not applied, and then goes to step ST24.

In step ST24, the adaptive offset filter calculates a cost of the band offset. The adaptive offset filter 35 calculates an offset with respect to the band offset, and calculates a cost in case the calculated offset is used.

Figure 8:
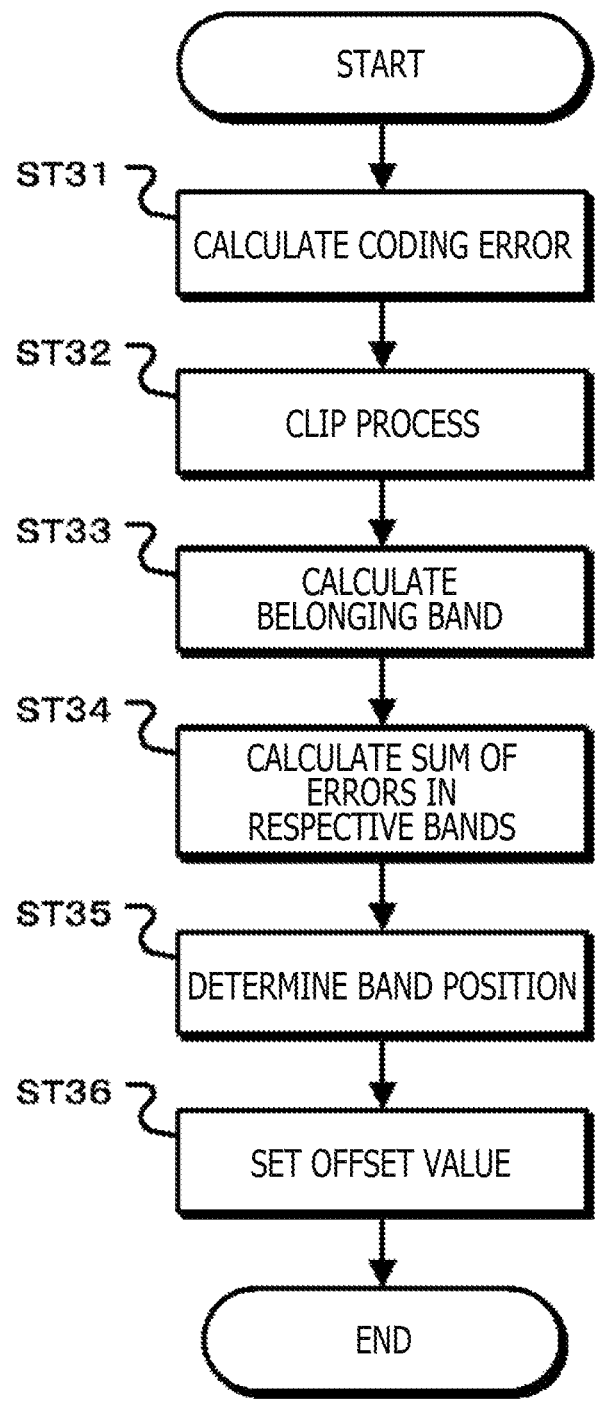
FIG. 8 is a flowchart illustrating an offset calculating operation.

FIG. 8 is a flowchart illustrating an offset calculating operation. Incidentally, FIG. 8 illustrates a case in which the original image data of a target to be coded are of a 10-bit width.

In step ST31, the adaptive offset filter calculates a coding error. The adaptive offset filter 35 calculates a coding error of each pixel using the original image data and the decoded image data, and then goes to step ST32.

In step ST32, the adaptive offset filter performs a clip process. The adaptive offset filter 35 clips the coding error calculated in step 131 within a range of ±31, and then goes to step ST33.

In step ST33, the adaptive offset filter detects a belong-to band. For example, in case the bit depth of a pixel is of 10 bits, the adaptive offset filter 35 performs a process for making a right shift by a fixed quantity of 5 bits and uses a band indicated by the value of higher-order 5 bits as a belong-to band, for each of the pixels of decoded image data. Furthermore, in case the bit depth of a pixel is of 8 bits, the adaptive offset filter 35 makes a right shift and uses a band indicated by the value of higher-order 3 bits as a belong-to band, in the same manner as with the 10 bits. The adaptive offset filter 35 detects a belong-to band to which each pixel belongs, and then goes to step ST34.

In step ST34, the adaptive offset filter calculates the sum of errors in each of the bands. The adaptive offset filter 35 calculates the sum of errors in each of the bands based on the coding error clipped in step ST32 and the belong-to band detected in step ST33, and then goes to step ST35.

In step ST35, the adaptive offset filter determines band positions. The adaptive offset filter 35 selects 4 successive bands where the sum of errors is maximum and uses the starting points of the selected 4 bands as band positions, and then goes to step ST36.

In step ST36, the adaptive offset filter determines an offset value. The adaptive offset filter 35 divides the sum of errors in the selected 4 successive bands by the number of pixels belonging thereto, clips the result of the division within the range of ±31, and uses the clipped result as an offset value.

FIG. 9 illustrates an example of the offset calculating operation. In FIG. 9, the LCU is of a size of 16×16 pixels for the sake of brevity. In FIG. 9, (a) illustrates an original image data. In FIG. 9, (b) illustrates decoded image data. In FIG. 9, (c) illustrates coding errors. In FIG. 9, (d) illustrates belong-to bands detected for respective pixels on the basis of the decoded image data.

Here, the sums of errors in the respective bands and the numbers of belonging pixels are calculated as illustrated in (e) of FIG. 9. Therefore, the adaptive offset filter 35 sets the parameter "sao_band_position" indicating the position of the band to "4." Furthermore, the adaptive offset filter 35 sets "sao_offset_abs" indicating the absolute value of the offset value to "0, 26(=1638/63), 0, 0." Moreover, the adaptive offset filter 35 sets "sao_offset_sign" indicating the positive or negative of the offset value to "1 (1 indicates a positive value), 1, 1, 1."

The adaptive offset filter 35 calculates a cost when the offset value calculated by the process illustrated in FIG. 8 is used, and then goes to step ST25 illustrated in FIG. 6.

In step ST25, the adaptive offset filter performs an optimum mode determining process. The adaptive offset filter 35 compares the costs calculated by the processing of steps ST23 and ST24 with each other, and specifies, for each LCU, a mode of the SAO process that is capable of maximizing the coding efficiency on the basis of the result of the comparison.

After having gone from step ST21 or step ST22 to step ST26, the adaptive offset filter 35 calculates a cost when the SAO process is turned off. The adaptive offset filter calculates a cost in case the SAO process is not applied, and then goes to step ST27.

In step ST27, the adaptive offset filter calculates a cost of the edge offset. The adaptive offset filter 35 calculates an offset value and a cost corresponding to the offset value with respect to each of combinations of the classes of the edge offset and the categories 1 through 4, and then goes to step ST28.

In step ST28, the adaptive offset filter calculates a cost of the band offset. The adaptive offset filter 35 calculates an offset with respect to the band offset, calculates a cost in case the calculated offset is used, and then goes to step ST29.

In step ST29, the adaptive offset filter performs an optimum mode determining process. The adaptive offset filter 35 compares the costs calculated by the processing of steps ST26 through ST28 with each other, and specifies, for each LCU, a mode of the SAO process that is capable of maximizing the coding efficiency on the basis of the result of the comparison.

By performing the foregoing processing sequence, the adaptive offset filter 35 specifies an optimum mode of the SAO process and an offset value depending on TUs in the transformation skip mode in an LCU. Furthermore, the adaptive offset filter 35 carries out the SAO process using the offset value corresponding to the optimum mode in the optimum mode determined for each LCU. Therefore, even though TUs in the transformation skip mode are included, it is possible to restrain a reduction in the image quality of the decoded image due to a discontinuity at the block boundary between the TUs in the transformation skip mode and TUs where orthogonal transformation has been performed.

Figure 10:
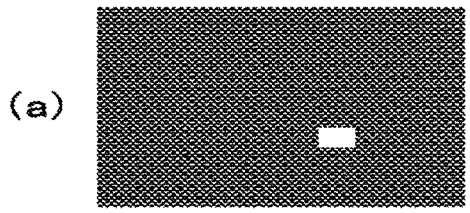
FIG. 10 is a set of diagrams illustrating an operational example of an image coding process.

FIG. 10 illustrates an operational example of the image coding process. FIG. 10 illustrates a case in which a TU as a target to be processed is of a size of 8×8 pixels. In FIG. 10, (a) schematically illustrates a portion of an original image. In FIG. 10, (b) illustrates the portion of the original image. In FIG. 10, (c) illustrates a portion of predicted imaged data. In FIG. 10, (d) illustrates residual data.

When an orthogonal transformation is performed on residual data of a TU as a target to be processed that includes an impulse image (e.g., an image including a background image having pixel values "196" and a subject image having a pixel value "990"), the transform coefficient is of values illustrated in (e) of FIG. 10. When the transform coefficient is quantized, the quantized data are of values illustrated in (f) of FIG. 10. When the quantized data are dequantized and further inversely orthogonally transformed, residual data illustrated in (g) of FIG. 10 are obtained. Decoded image data produced by adding predicted image data and the decoded residual image data to each other are of values illustrated in (h) of FIG. 10, for example, where the pixel values of the background image are varied, producing so-called mosquito noise.

In case the ID as the target to be processed is in the transformation skip mode, when the transformation skip process is performed on the residual data, the transform coefficient is of values illustrated in (i) of FIG. 10. When the transform coefficient is quantized, the quantized data are of values illustrated in (j) of FIG. 10. When the quantized data are dequantized and further inversely orthogonally transformed, residual data illustrated in (k) of FIG. 10 are obtained. Decoded image data produced by adding predicted image data and the decoded residual image data are of values illustrated in (m) of FIG. 10, for example. In other words, though the decoded image can reproduce the impulse image, the pixel values "170" of the background image of the TU as the target to be processed and the pixel values "196" of the background image of the other TU are different from each other, tending to make the block boundary conspicuous.

FIG. 11 illustrates an operation in case the SAO process is performed on the decoded image of a TU in the transformation skip mode. In FIG. 11, (a) illustrates the decoded image data of the TU in the transformation skip mode. In FIG. 11, (b) illustrates the decoded image data in case edge offset is performed as the SAO process. In FIG. 11, (b) illustrates a case in which a direction used to determine a category is a vertical direction (90 degrees) and the absolute value "sao_offset_sign" of an offset is set to "0, 0, 13, 30." In this case, "13" is subtracted from the pixel values in the category 3, and "30" is subtracted from the pixel values in the category 4. In the case of such an edge offset process, at the boundary between the TU in the transformation skip mode and an adjacent Tu, the pixel values are corrected from "170" into "183," making the change smoother. However, a DC shift in the TU in the transformation skip mode cannot be corrected. In the impulse area, moreover, a process in a direction to lower the peak, i.e., a process for correcting the pixel value from "986" into "966" is carried out. In FIG. 11, (c) schematically illustrates a decoded image produced when an edge offset is performed as the SAO process.

According to the present technology, EO is inhibited depending on a TU in the transformation skip mode in an LCU, and band offset is performed in the TU in the transformation skip mode, for example. In FIG. 11, (d) illustrates decoded image data produced when band offset performed as the SAO process. In FIG. 11, (d) illustrates a case in which the parameter "sao_band_position" indicating the position of the band is set to "5," the parameter "sao_offset_abs" indicating the absolute value of the offset value is set to "26, 0, 0, 0," and the parameter "sao_offset_sign" indicating the positive or negative of the offset value is set to "1, 1, 1, 1." In this case, the DC of the TU in the transformation skip mode is corrected from "170" into "196," making less conspicuous the boundary between the TU in the transformation skip mode and the adjacent TU. In FIG. 11, (e) schematically illustrates a decoded image produced when the band offset process is performed as the SAO process.

According to the present technology, therefore, since the edge offset process is inhibited depending on a TU in the transformation skip mode in an LCU, a coded stream for suppressing a reduction in the image quality can be generated by performing the SAO process even if a TU in the transformation skip mode is included in an LCU.

<1-6. Other Operation of Adaptive Offset Filter>

In the above embodiment, there has been illustrated a case in which it is determined whether EO is to be inhibited or not on the basis of the transformation skip information with respect to a TU in the change skip mode in an LCU. However, not necessarily the transformation skip information, but other information may be used to determine whether the edge offset process is to be inhibited or not. For example, in an image having a high dynamic range (HDR) where the information of brightness is increased, even a slight DC shift has a large adverse effect on the image quality. Consequently, in case an input image as a target to be coded has a high dynamic range, the image coding apparatus 10 inhibits the edge offset process. For example, in case an input image is in accordance with the Hybrid Log Gamma system or the PQ (Perceptual Quantizer) system, the image coding apparatus 10 inhibits the edge offset process. According to such operation, it is possible to generate a coded stream capable of obtaining a decoded image of high image quality with a DC shift restrained.

<1-7. Other operation of Image Coding Apparatus>

Incidentally, in case an input image is a low-range image or a middle-range image, the transformation skip process according to intra-prediction may invite a reduction in its image quality. FIG. 12 is a set of diagrams illustrating a process in case an original image is an image of low-range components. The image of low-range components illustrated in FIG. 12 is an image of DC components, for example. Furthermore, it is illustrated in the image of low-range components that the boundary between a block as a target to be coded and adjacent pixels is an edge boundary or the like, with no spatial correlation.

In FIG. 12, (a) illustrates a case in which an original image is an image of low-range components. In FIG. 12, (b) illustrates an intra-predicted image in case an original image is an image of low-range components. Incidentally, the intra-predicted image in case an original image is an image of low-range components is a DC-predicted image, for example. In FIG. 12, (c) illustrates residual data in case an original image is an image of low-range components. The residual data are of large values as it has no spatial correlation to adjacent pixels.

Here, a case in which the transformation skip process is performed will be described below. When the transformation skip process is performed on residual data in case an original image is an image of low-range components, the transformation skip coefficient is of values illustrated in (d) of FIG. 12. Since a left bit shift process is performed in the transformation skip process so that the quantizing section can quantize the coefficient of the orthogonal transform and the residual data, the transformation skip coefficient illustrated in (d) of FIG. 12 is of values produced when the bit shift process is performed on the residual data illustrated in (c) of FIG. 12. In FIG. 12, (e) illustrates quantized data of the transformation skip coefficient. When the quantized data are dequantized and further inversely orthogonally transformed, decoded residual data illustrated in (f) of FIG. 12 are obtained. Furthermore, decoded image data illustrated in (g) of FIG. 12 are obtained by adding predicted image data to the decoded residual image data. Specifically, the decoded imaged data in case the transformation skip process is performed represent an image in which a DC shift is caused compared with the input image data illustrated in (a) of FIG. 12.

Next, a case in which the orthogonal transformation process is performed will be described below. A transform coefficient in case the orthogonal transformation process is performed on residuals in case an original image is an image of low-range components is of values illustrated in (h) of FIG. 12. In FIG. 12, (i) illustrates quantized data of the transform coefficient. When the quantized data are dequantized and further inversely orthogonally transformed, decoded residual data illustrated in (j) of FIG. 12 are obtained. Furthermore, decoded image data illustrated in (k) of FIG. 12 are obtained by adding predicted image data to the decoded residual image data. The decoded image data produced using the orthogonal transformation represent an image in which a DC shift is small compared with the input image data illustrated in (a) of FIG. 12.

As described above, in case an input image is an image of low-range components, when the transformation skip process is performed by intra-prediction, the decoded image may become an image of lowered image quality compared with the case in which the orthogonal transformation process is performed.

Figure 13:
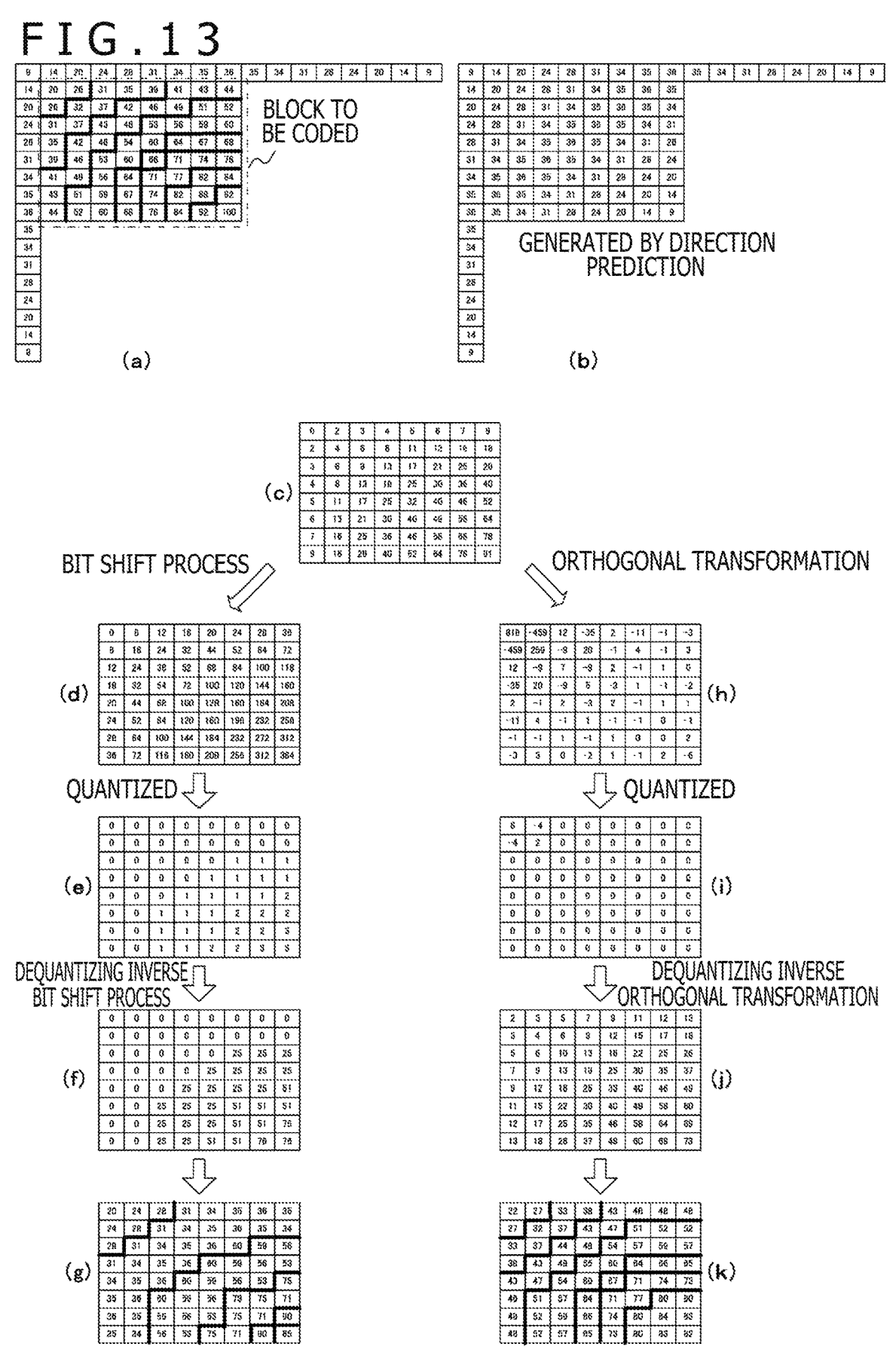

FIG. 13 is a set of diagrams illustrating a process in case an original image is an image of middle-range components. The image of middle-range components illustrated in FIG. 13 is an image of frequency components higher than the low-range components and of frequency components lower than predetermined frequency components.

In FIG. 13, (a) illustrates a case in which an original image is an image of middle-range components. In FIG. 13, (b) illustrates an intra-predicted image in case an original image is an image of middle-range components. Incidentally, the intra-predicted image in case an original image is an image of medium-range components is an image generated by direction prediction, for example. In FIG. 13, (c) illustrates residual data in case an original image is an image of middle-range components. In (a) of FIG. 13 and (g) and (k) of FIG. 13 to be described later, pixel boundaries between pixel values included in a predetermined range and pixel values included in another predetermined range are indicated by bold lines in order to recognize gradation changes with ease.

When the transformation skip process is performed on residual data in case an original image is an image of middle-range components, the transformation skip coefficient is of values illustrated in (d) of FIG. 13. Since a left bit shift process is performed is the transformation skip process so that the quantizing section can quantize the coefficient of the orthogonal transform and the residual data, the transformation skip coefficient illustrated in (d) of FIG. 13 is of values produced when the bit shift process is performed on the residual data illustrated in (c) of FIG. 13. In FIG. 13, illustrates quantized data of the transformation skip coefficient. When the quantized data are dequantized and further inversely orthogonally transformed, decoded residual data illustrated in (f) of FIG. 13 are obtained. Furthermore, decoded image data illustrated in (g) of FIG. 13 are obtained by adding predicted image data to the decoded residual image data. Specifically, the decoded imaged data in case the transformation skip process is performed represent a gradation whose pixel value changes are stepwise, failing to properly reproduce continuous gradation changes, compared with the input image data illustrated in (a) of FIG. 13.

Next, a case in which the orthogonal transformation process is performed will be described below. A transform coefficient in case the orthogonal transformation process is performed on residuals in case an original image is an image of middle-range components is of values illustrated in (h) of FIG. 13. In FIG. 13, (i) illustrates quantized data of the transform coefficient. When the quantized data are dequantized and further inversely orthogonally transformed, decoded residual data illustrated in (j) of FIG. 13 are obtained. Furthermore, decoded image data illustrated in (k) of FIG. 13 are obtained by adding predicted image data to the decoded residual image data. The decoded image data produced using the orthogonal transformation process make the reproducibility of the gradation changes of the input image data illustrated in (a) of FIG. 13 high compared with (g) of FIG. 1.

As described above, in case an input image is an image of middle-range components, when the transformation skip process is performed by intra-prediction, the decoded image may become an image of lowered image quality compared with the case in which the orthogonal transformation process is performed. In the other operation of the image coding apparatus, therefore, the image quality of decoded images is restrained from being lowered by limiting selective operation of intra-prediction or inter-prediction on the basis of the determined result as to whether the transformation skip process is to be performed or not or whether there exists a TU in the transformation skip mode or not, etc.

Figure 14:
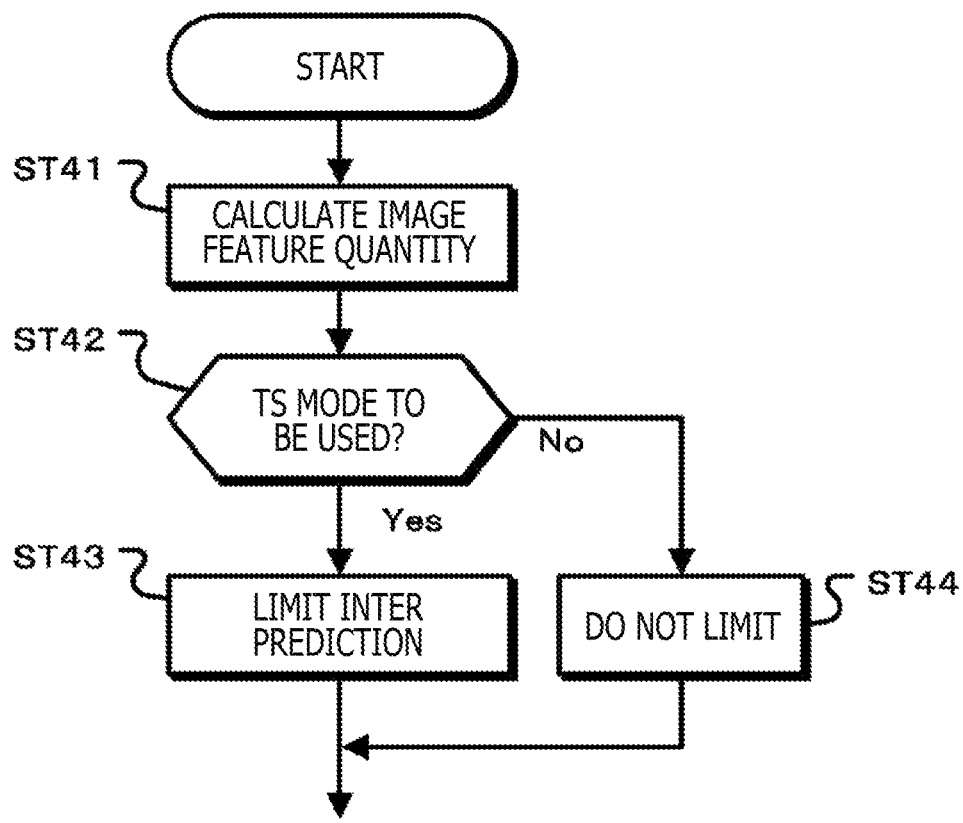
FIG. 14 is a flowchart illustrating an operation for determining whether a transformation skip process is to be used or not.

FIG. 14 is a flowchart illustrating an operation for determining whether the transformation skip process is to be used or not. In step ST41, the prediction selector calculates an image feature quantity. The image feature quantity is a feature quantity capable of determining whether or not an input image contains an artificial image such as a computer graphics image or the like.

The prediction selector 43 calculates an image feature quantity using the original image data supplied from the screen rearranging buffer 21, and then goes to step ST42. Incidentally, an image feature quantity may be calculated using residual data.

The prediction selector 13 calculates at least either one of the variance of pixel values, a total variation (Total Variation, the sum of the absolute values of the gradients of the pixels) thereof, the differences thereof with a central value, a histogram thereof, etc., for example, as an image feature quantity. An image feature quantity thus calculated makes it possible to determine whether or not the input image is an artificial image that contains many changes. Furthermore, artificial images are more likely to have large maximum values of luminance data and color difference data than natural images different from the artificial images. Therefore, luminance data or color difference data or maximum values of luminance data and color difference data may be used as an image feature quantity.

In step ST42, the predicted image selector determines whether or not the transformation skip mode (TS mode) is to be used. The prediction selector 43 determines whether or not the transformation skip mode is to be used on the basis of the image feature quantity calculated in step ST41.

Figure 15:
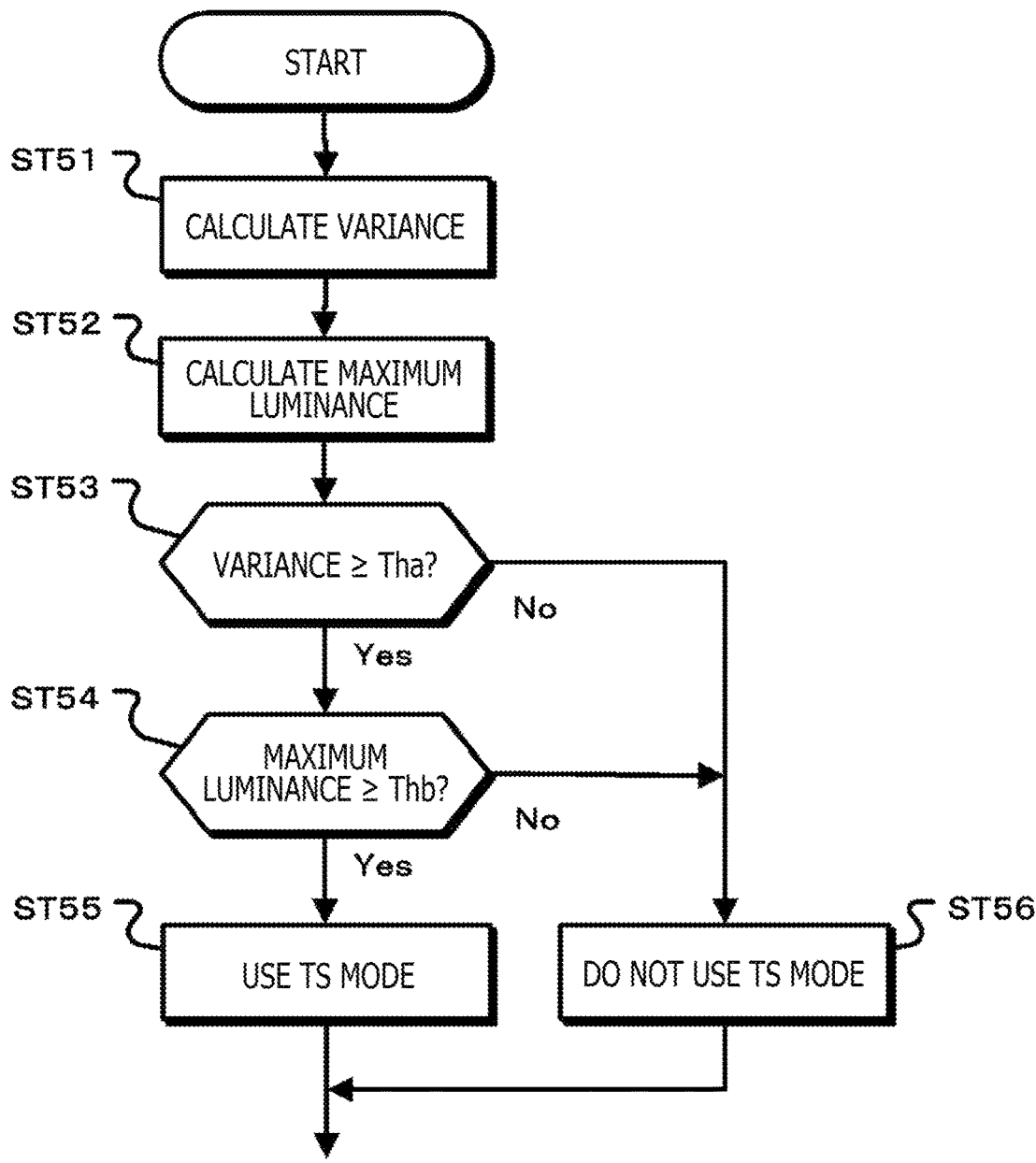
FIG. 15 is a flowchart illustrating a first specific example of the operation for determining whether a transformation skip process is to be used or not.

FIG. 15 is a flowchart illustrating a first specific example of the operation for determining whether the transformation skip process is to be used or not.

In step ST51, the prediction selector calculates variance as an image feature quantity. The prediction selector 43 calculates the variance of 4×4 pixels in the original image data, and then goes to step ST52.

In step ST52, the prediction selector calculates a maximum luminance as an image feature quantity. The prediction selector 43 calculates a maximum luminance in the image of 4×4 pixels used in step ST51, and then goes to step ST53.

In step ST53, the prediction selector determines whether or not the variance is equal to or larger than a threshold value Tha. If the variance calculated in step ST41 is equal to or larger than the threshold value Tha, then the prediction selector 43 goes to step ST54. If the variance is not equal to or larger than the threshold value Tha, then the prediction selector 43 goes to step ST56.

In step ST54, the prediction selector determines whether the maximum luminance is equal to or larger than a threshold value Thb. If the maximum luminance calculated in step ST52 is equal to or larger than the threshold value Thb, then the prediction selector 43 goes to step ST55. If the maximum luminance is not equal to or larger than the threshold value Thb, then the prediction selector 43 goes to step ST56.

In step ST55, the prediction selector decides that the transformation skip mode (TS mode) is to be used. In step ST56, the prediction selector decides that the transformation skip mode (TS mode) is not to be used.

Figure 16:
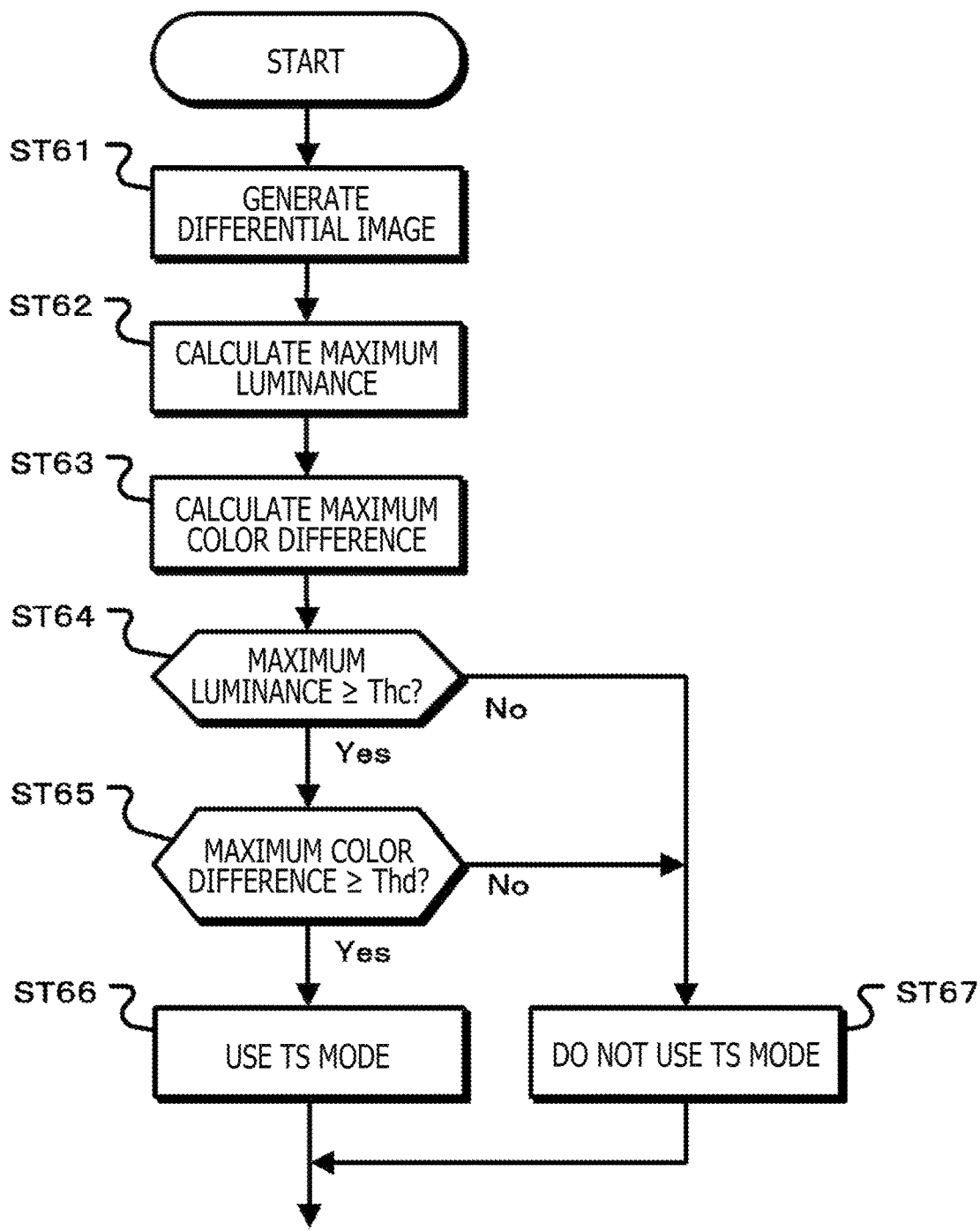
FIG. 16 is a flowchart illustrating a second specific example of the operation for determining whether a transformation skip process is to be used or not.

FIG. 16 is a flowchart illustrating a second specific example of the operation for determining whether the transformation skip process is to be used or not.

In step ST61, the prediction selector generates a differential image. The prediction selector 43 generates a differential image representing the difference between the original image and the filtered original image using a median filter of 3×3 pixels, for example, and then goes to step ST62.

In step ST62, the prediction selector calculates a maximum luminance as an image feature quantity. The prediction selector 43 calculates a maximum luminance in an image of 4×4 pixels in the differential image generated in step ST61, and then goes to step ST63.

In step ST63, the prediction selector calculates a maximum color difference as an image feature quantity. The prediction selector 43 calculates a maximum color difference in the image of 4×4 pixels used in step ST62, and then goes to step ST64.

In step ST64, the prediction selector determines whether or not the maximum luminance is equal to or larger than a threshold value Thc. If the maximum luminance calculated in step ST62 is equal to or larger than the threshold value Thc, then the prediction selector 43 goes to step ST65. If the maximum luminance is not equal to or larger than the threshold value Thc, then the prediction selector 43 goes to step ST67.

In step ST65, the prediction selector determines whether or not the maximum color difference is equal to or larger than a threshold value Thd. If the maximum color difference calculated in step ST63 is equal to or larger than the threshold value Thd, then the prediction selector 43 goes to step ST66. If the maximum color difference is not equal to or larger than the threshold value Thd, then the prediction selector 43 goes to step ST67.

In step ST66, the prediction selector decides that the transformation skip mode (TS mode) is to be used. In step ST67, the prediction selector decides that the transformation skip mode (TS mode) is not to be used.

As illustrated in FIG. 15 or FIG. 16, the prediction selector 43 calculates an image feature quantity from the original image or the differential image, and determines whether the transformation skip mode is to be used or not on the basis of the calculated image feature quantity. Furthermore, if the prediction selector 43 decides that the transformation skip mode is not to be used, then the prediction selector 43 selects an intra-prediction or an inter-prediction on the basis of the cost. Moreover, if the prediction selector 43 decides that the transformation skip mode is to be performed, then the prediction selector 43 selects an inter-prediction in the selection of an intra-prediction or an inter-prediction. By thus controlling the use of the transformation skip mode and the selection of a prediction, the reproducibility of a low range or a middle range is prevented from being lowered due to the transformation skip mode performed in an intra-prediction.

Incidentally, FIG. 15 and FIG. 16 illustrate the operation to determine whether the transformation skip mode is to be used or not. However, the operation to select an intra-prediction or an inter-prediction and the operation to determine whether the transformation skip mode is to be used or not may be performed in combination with each other.

Figure 17:
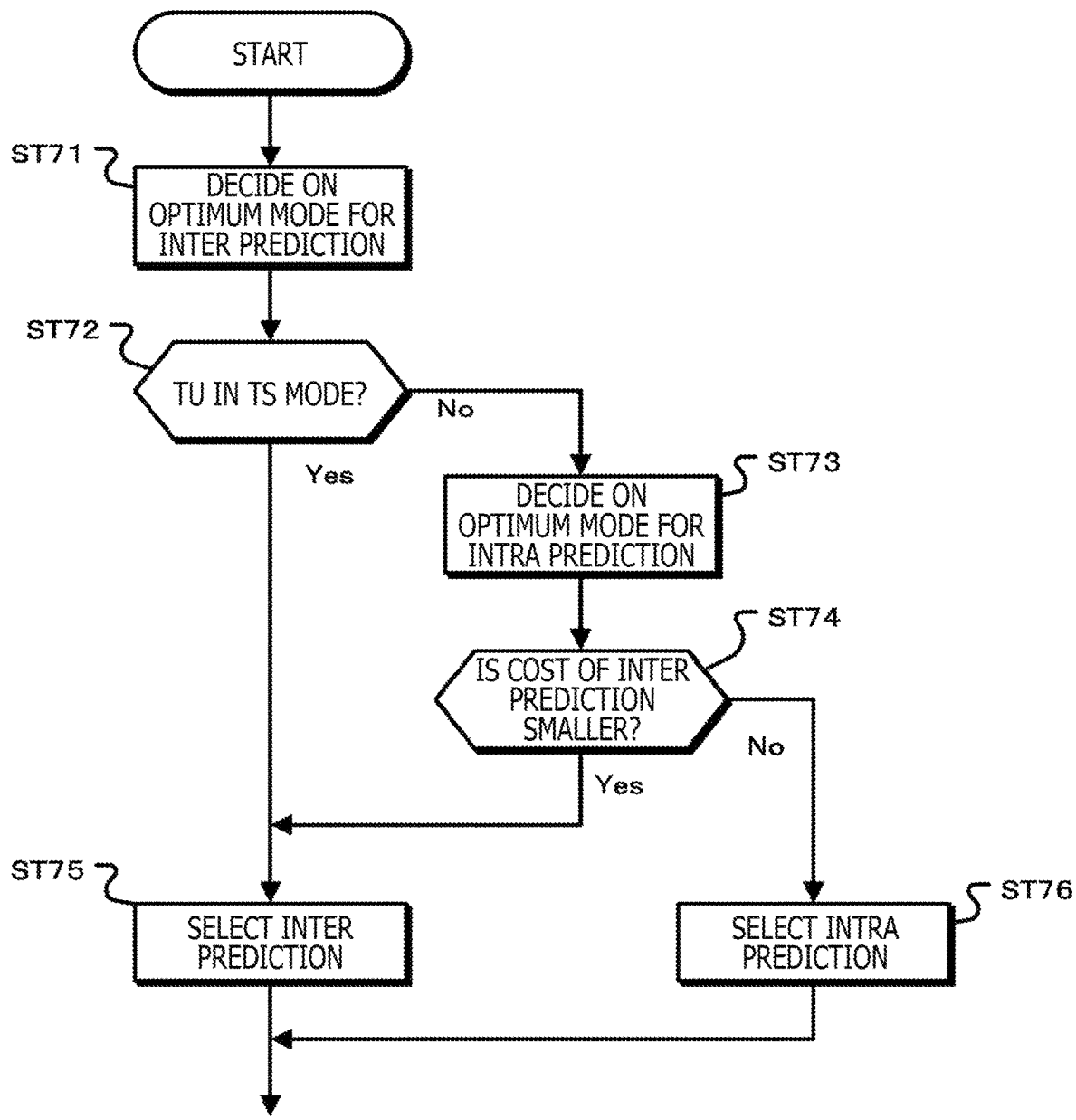
FIG. 17 is a flowchart illustrating a case in which a prediction selecting operation and a transformation skip process determining operation are carried out in combination with each other.

FIG. 17 is a flowchart illustrating a case in which the prediction selecting operation and the transformation skip process determining operation are carried out in combination with each other.

In step ST71, the motion predicting and compensating section decides on an optimum mode for an inter-prediction. The motion predicting and compensating section 42 decides on either a motion vector, a PU size, a TU size, or an orthogonal transformation/transformation skip, for example, that minimizes the cost, and then goes to step ST72. Incidentally, the motion predicting and compensating section 42 may control the transformation skip controller 44 to enable the orthogonal transformation section 23 to perform the orthogonal transformation process or the transformation skip process for calculating a cost.

In step ST72, the prediction selector determines whether or not there exists a TU in the transformation skip mode (TS mode). If there exists a TU in the transformation skip mode in the optimum mode selected in step ST71, then the prediction selector 43 goes to step ST75. If there exists no TU in the transformation skip mode, then the prediction selector 43 goes to step ST73.

In step ST73, the intra-predicting section decides on an optimum mode in an intra-prediction. The intra-predicting section 41 decides on a prediction mode that minimizes the cost, and then goes to step ST74.

In step ST74, in case the cost of an inter-prediction is smaller than the cost of an intra-prediction, the prediction selector goes to step ST75, and in case the cost of as inter-prediction is not smaller than the cost of an intra-prediction, the prediction selector goes to step ST76.

In step ST75, the prediction selector selects an inter-prediction. In step ST76, the prediction selector selects an intra-prediction.

By performing the foregoing processing sequence, since an inter-prediction is selected in case a TU in the transformation skip mode is included in an optimum mode, the image quality of a decoded image is prevented from being lowered.

According to basic profiles Main10, Main Still) of the HEVC standards, as the transformation skip mode can be set with respect to a TU of 4×4 pixels, an inter-prediction may be selected in case there exists a TU of 4×4 pixels in the transformation skip mode.

Figure 18:
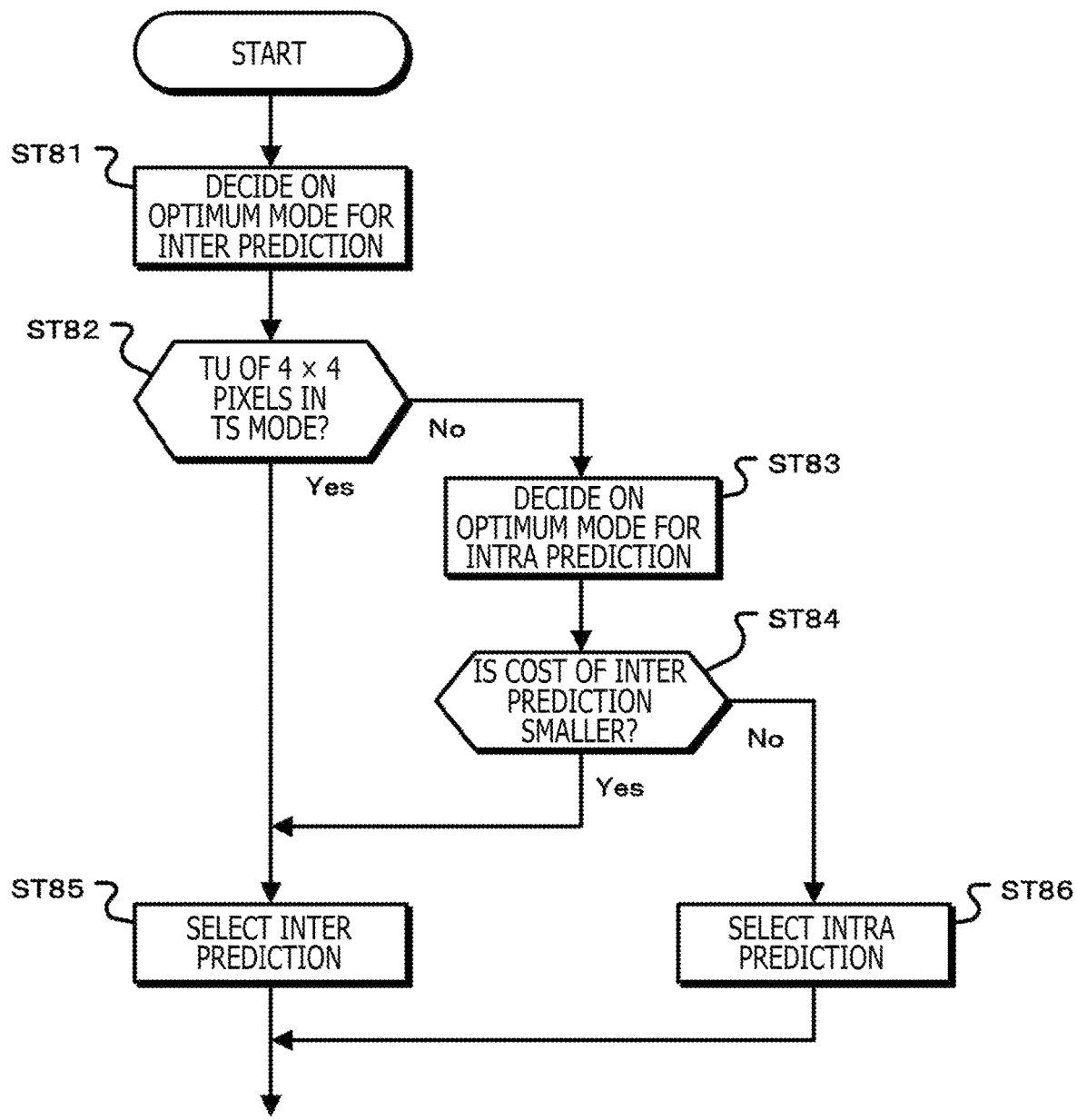
FIG. 18 is a flowchart illustrating a case in which a prediction selecting operation is carried out depending on the existence of a TU of 4×4 pixels in a transformation skip mode.

FIG. 18 is a flowchart illustrating a case in which a prediction selecting operation is carried out depending on the existence of a TU of 4×4 pixels in the transformation skip mode.

In step ST81, the motion predicting and compensating section selects an optimum mode in an inter-prediction. The motion predicting and compensating section 42 decides on either a motion vector, a PU size, a TU size, or an orthogonal transformation/transformation skip, for example, that minimizes the cost, and then goes to step ST82.

In step ST82, the prediction selector determines whether or not there exists a TU of 4×4 pixels in the transformation skip mode (TS mode). If there exists a TU in the transformation skip mode in the optimum mode selected step ST81, then the prediction selector 43 goes to step ST85. If there exists no TU in the transformation skip mode, then the prediction selector 43 goes to step ST83.

In step ST83, the intra-predicting section decides on an optimum mode in an intra-prediction. The intra-predicting section 41 decides on a prediction mode that minimizes the cost, and then goes to step ST84.

In step ST84, in case the cost of an inter-prediction is smaller than the cost of an intra-prediction, the prediction selector goes to step ST85, and in case the cost of as inter-prediction is not smaller than the cost of an intra-prediction, the prediction selector goes to step ST86.

In step ST85, the prediction selector selects an inter-prediction. In step ST86, the prediction selector selects an intra-prediction.

By performing the foregoing processing sequence, since an inter-prediction is selected in case a TU in the transformation skip mode is included in an optimum mode, the image quality of a decoded image is prevented from being lowered. Moreover, in case there exists a TU of 4×4 pixels in the transformation skip mode, an inter-prediction is selected.

2. CONFIGURATION AND OPERATION IN CASE IMAGE PROCESSING APPARATUS PERFORMS DECODING PROCESS

Next, a configuration and operation of an image processing apparatus that performs a decoding process on a coded stream generated by the above image coding apparatus 10 will be described below.

<2-1. Configuration of Image Decoding Apparatus>

Figure 19:
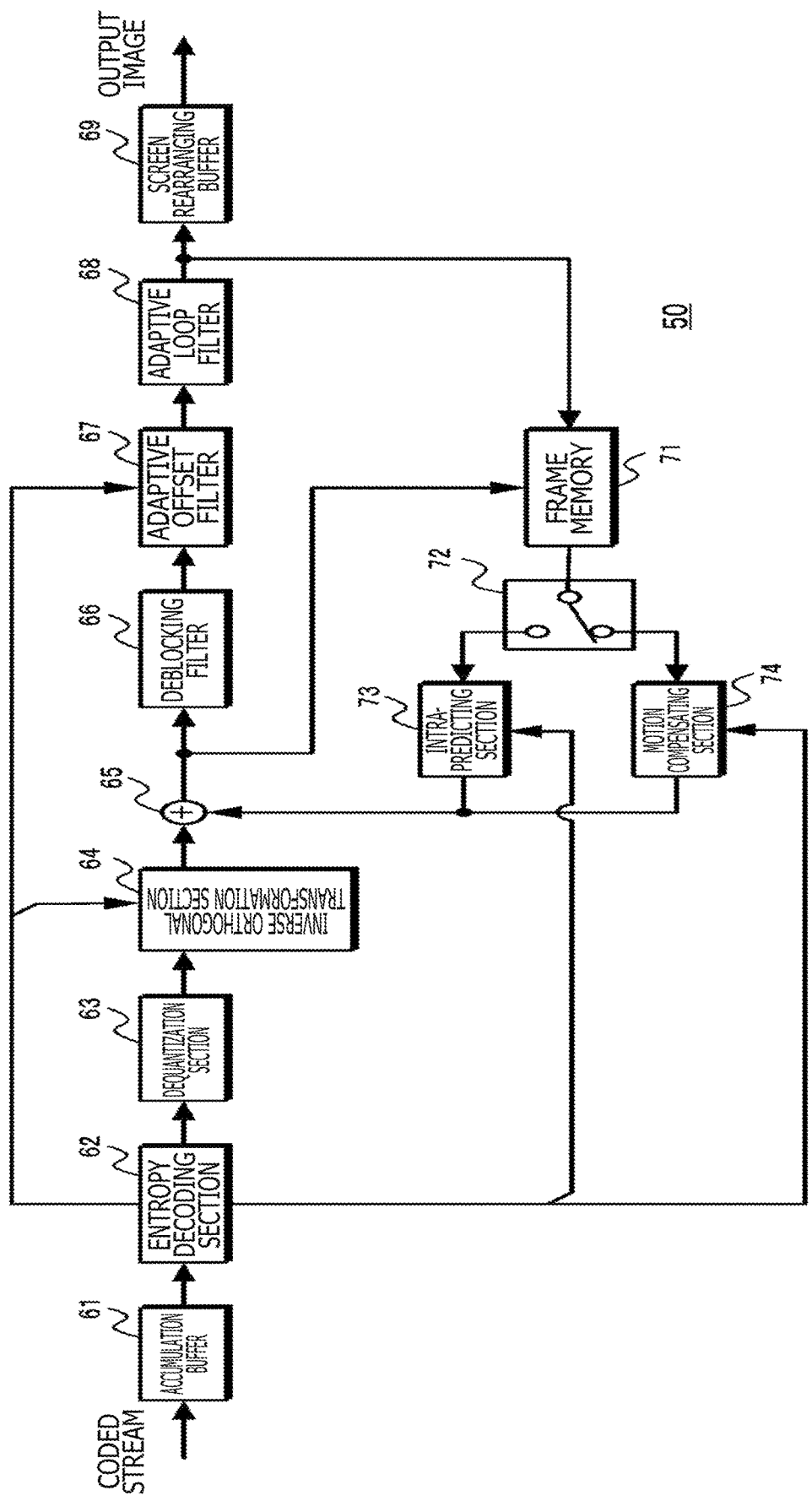
FIG. 19 is a diagram illustrating a configuration of an image decoding apparatus.

FIG. 19 is a diagram illustrating a configuration of an image decoding apparatus. The image decoding apparatus 50 is a decoding apparatus compatible with the image coding apparatus 10 illustrated in FIG. 1.

A coded stream (data) coded by the image coding apparatus 10 is supplied through a given transmission path or the like to the image decoding apparatus 50 and decoded thereby.

The image decoding apparatus 50 has an accumulation buffer 61, an entropy decoding section 62, a dequantization section 63, an inverse orthogonal transformation section 64, an operator 65, a deblocking filter 66, an adaptive offset filter 67, an adaptive loop filter 68, and a screen rearranging buffer 69. In addition, the image decoding apparatus 50 has a frame memory 71, a selector 72, an intra-predicting section 73, and a motion compensating section 74.

The accumulation buffer 61 receives and accumulates the transmitted coded stream. This coded stream is read at a predetermined timing and output to the entropy decoding section 62.

The entropy decoding section 62 performs an entropy decoding process on the coded stream, outputs a parameter such as information representing an obtained intra-prediction mode to the intra-predicting section 73, and outputs parameters such as information representing an inter-prediction mode and motion vector information to the motion compensating section 74. Furthermore, the entropy decoding section 62 outputs a parameter such as information about a TU in the transformation skip mode or the like to the inverse orthogonal transformation section 64. Moreover, the entropy decoding section 62 outputs a decoded parameter about an adaptive offset filter to the adaptive offset filter 67.

The dequantization section 63 dequantizes quantized data decoded and obtained by the entropy decoding section 62 according to a process corresponding to the quantizing process of the quantization section 24 illustrated in FIG. 1. Specifically, the dequantization section 63 dequantizes the quantized data according to a process similar to the process of the dequantization section 31 illustrated in FIG. 1, using the quantized parameters supplied from the image coding apparatus 10. The dequantization section 63 outputs the dequantized data to the inverse orthogonal transformation section 64.

The inverse orthogonal transformation section 64 switches the operation of an inverse orthogonal transformation on the basis of the parameters supplied from the entropy decoding section 62. In case the data supplied from the dequantization section 63 are data of a TU not in the transformation skip mode, the inverse orthogonal transformation section 64 performs an inverse orthogonal transformation according to a process corresponding to the orthogonal transformation process of the orthogonal transformation section 23 illustrated in FIG. 1, and obtains and outputs decoded residual data corresponding to the residual data prior to the orthogonal transformation in the image coding apparatus 10 to the operator 65. In case the data supplied from the dequantization section 63 are data of a TU in the change skip mode, the inverse orthogonal transformation section 64 outputs the data to the operator 65 without performing an inverse orthogonal transformation thereon. In case the bit shift process is performed on residual data of a TU in the change skip mode, the inverse orthogonal transformation section 64 performs a bit shift process in the opposite direction.

The operator 65 is supplied with predicted image data from the intra-predicting section 73 or the motion compensating section 74. The operator 65 adds the decoded residual data and the predicted image data to each other, obtaining decoded image data corresponding to the original image data before the predicted image data are subtracted therefrom by the operator 22 of the image coding apparatus 10. The operator 65 outputs the decoded image data to the deblocking filter 66.

The deblocking filter 66 removes a block distortion from the decoded image data by performing an appropriate deblocking filter process thereon. The deblocking filter 66 outputs the result of the filter process to the adaptive offset filter 67.

The adaptive offset filter 67 performs the SAO process on an image filtered by the deblocking filter 66.

The adaptive offset filter 67 performs a filter process on the image filtered by the deblocking filter 66 with respect to each LCU, using the parameters supplied from the entropy decoding section 62. The adaptive offset filter 67 outputs a filtered image to the adaptive loop filter 68.

The adaptive loop filter 68 is arranged similarly to the adaptive loop filter 36 illustrated in FIG. 1, and performs an adaptive loop filter process on each LCU. The adaptive loop filter 68 performs the filter process for each LCU on the image filtered by the adaptive offset filter 67 using the filter coefficient, and outputs the result of the filter process to the screen rearranging buffer 69 and the frame memory 71.

The screen rearranging buffer 69 rearranges images. Specifically, the order of frames rearranged for a coding order by the screen rearranging buffer 21 illustrated in FIG. 1 is rearranged into the original display order.

The output from the adaptive loop filter 68 is also supplied to the frame memory 71. The frame memory 71, the selector 72, the intra-predicting section 73, and the motion compensating section 74 correspond respectively to the frame memory 37, the selector 38, the intra-predicting section 41, and the motion predicting and compensating section 42 of the image coding apparatus 10.

The selector 72 reads an image to be used for an intra-prediction from the frame memory 71 and outputs the read image to the intra-predicting section 73. Furthermore, the selector 72 reads an image to be referred to against the image to be inter-processed, and outputs the read image to the motion compensating section 74.

The intra-predicting section 73 is appropriately supplied with information or the like representing an intra-prediction mode obtained by decoding header information from the entropy decoding section 62. The intra-predicting section 73 generates a predicted image from the reference image acquired from the frame memory 71 on the basis of the supplied information, and outputs the generated predicted image to the operator 65.

The motion compensating section 74 is supplied with information obtained by decoding the header information (prediction mode information, motion vector information, reference frame information, a flag, and various parameters, etc.) from the entropy decoding section 62. The motion compensating section 74 generates a predicted image from the reference image acquired from the frame memory 71 on the basis of the information supplied from the entropy decoding section 62, and outputs the generated predicted image to the operator 65.

<2-2. Operation of Image Decoding Apparatus>

Figure 20:
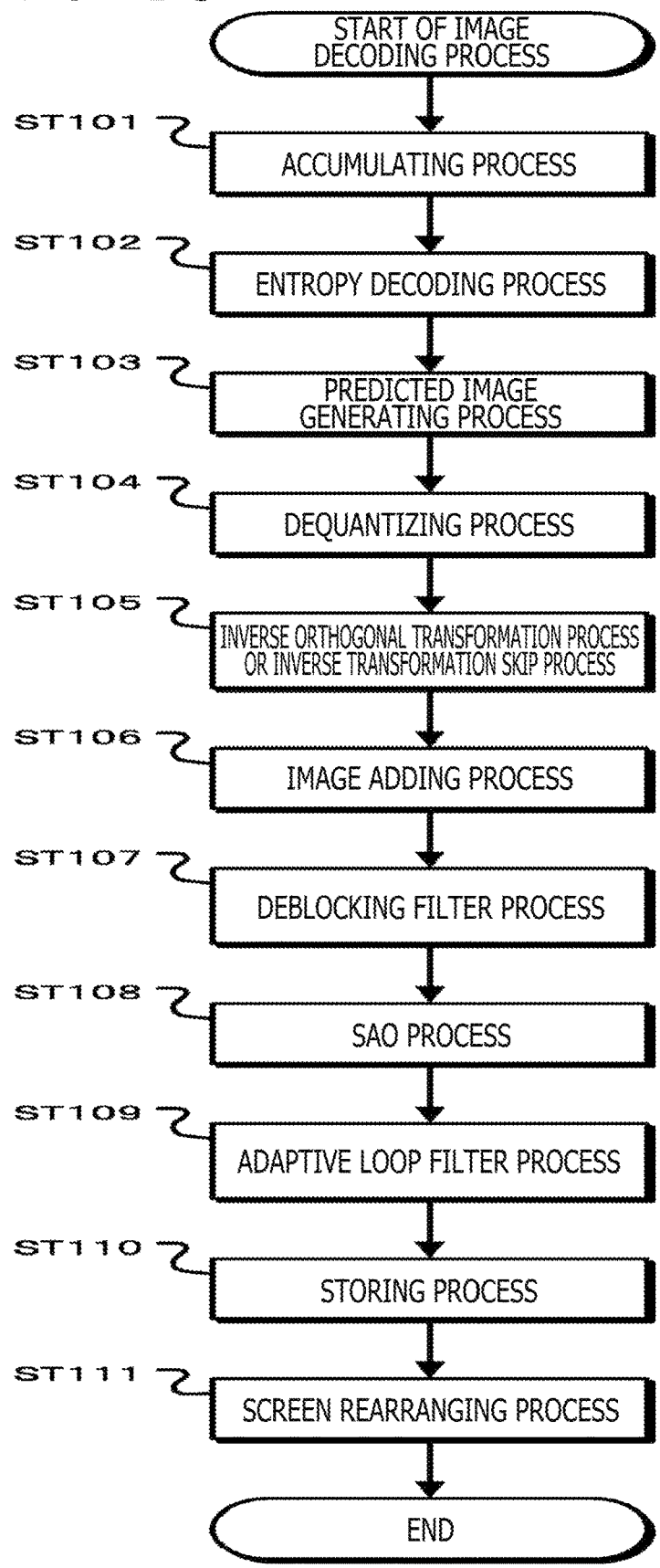
FIG. 20 is a flowchart illustrating operation of the image decoding apparatus.

Next, operation of the image decoding apparatus will be described below. FIG. 20 is a flowchart illustrating operation of the image decoding apparatus.

When a decoding process is started, the image decoding apparatus performs an accumulating process in step ST101. The accumulation buffer 61 of the image decoding apparatus 50 receives and accumulates a transmitted coded stream.

In step ST102, the image decoding apparatus performs an entropy decoding process. The entropy decoding section 62 of the image decoding apparatus 50 decodes the coded stream supplied from the accumulation buffer 61. An I picture, a P picture, and a B picture that have been coded by the entropy coding section 25 are decoded. Furthermore, prior to decoding the pictures, the entropy decoding section 62 also decodes information of parameters, such as motion vector information, reference frame information, prediction mode information (intra-prediction mode or inter-prediction mode), etc. In case the prediction mode information is intra-prediction mode information, the prediction mode information is supplied to the intra-predicting section 73. In case the prediction mode information is inter-prediction mode information, the motion vector information corresponding to the prediction mode information, etc. is supplied to the motion compensating section 74. A parameter representing information relating to a TU in the transformation skip mode is supplied to the inverse orthogonal transformation section 64, and a parameter relating to an adaptive offset filter is supplied to the adaptive offset filter 67.

In step ST103, the image decoding apparatus performs a predicted image generating process. The intra-predicting section 73 or the motion compensating section 74 of the image decoding apparatus 50 performs the predicted image generating process depending on the prediction mode information supplied from the entropy decoding section 62.

Specifically, in case the intra-prediction mode information is supplied from the entropy decoding section 62, the intra-predicting section 73 generates an intra-predicted image in the intra-prediction mode. In case the inter-prediction mode information is supplied from the entropy decoding section 62, the motion compensating section 74 performs a motion compensation process in the inter-prediction mode and generates an inter-predicted image. According to this processing, the predicted image (the intra-predicted image) generated by the intra-predicting section 73, or the predicted image (the inter-predicted image) generated by the motion compensating section 74 output to the operator 65.

In step ST104, the image decoding apparatus performs a dequantizing process. The dequantizing section 63 of the image decoding apparatus 50 dequantizes quantized data obtained by the entropy decoding section 62 according to a process corresponding to the quantizing process of the quantization section 24 illustrated in FIG. 1, and outputs the dequantized data to the inverse orthogonal transformation section 64.

In step ST105, the image decoding apparatus performs an inverse orthogonal transformation process or an inverse transformation skip process. The inverse orthogonal transformation section 64 of the image decoding apparatus 50 performs an inverse orthogonal transformation process based on the parameters supplied from the entropy decoding section 62. In case the dequantized data supplied from the dequantizing section 63 are the data of a TU not in the change skip mode, the inverse orthogonal transformation section 64 performs an inverse orthogonal transformation according to a process corresponding to the orthogonal transformation process of the orthogonal transformation section 23 illustrated in FIG. 1, and obtains and outputs decoded residual data corresponding to the residual data prior to the orthogonal transformation in the image coding apparatus 10 to the operator 65. Furthermore. In case the data supplied from the dequantizing section 63 are the data of a TU in the change skip mode, the inverse orthogonal transformation section 61 skips an inverse orthogonal transformation and outputs the data to the operator 65.

In step ST106, the image decoding apparatus performs an image adding process. The operator 65 of the image decoding apparatus 50 adds the predicted image data supplied from the intra-predicting section 73 or the motion compensating section 74 and the decoded residual data supplied from the inverse orthogonal transformation section 64 to each other, generating decoded image data. The operator 65 outputs the generated decoded image data to the deblocking filter 66 and the frame memory 71.

In step ST107, the image decoding apparatus performs a deblocking filter process. The deblocking filter 66 of the image decoding apparatus 50 performs a deblocking filter process on the image output from the operator 65. A block distortion is thus removed from the image. The decoded image from the deblocking filter 66 is output to the adaptive offset filter 67.

In step ST108, the image decoding apparatus performs an SAO process. The adaptive offset filter 67 of the image decoding apparatus 50 performs an SAO process on the image filtered by the deblocking filter 66, using a parameter relating to the SAO process supplied from the entropy decoding section 62. The adaptive offset filter 67 outputs the decoded image data after the SAO process to the adaptive loop filter 68.

In step ST109, the image decoding apparatus performs an adaptive loop filter process. The adaptive loop filter 68 of the image decoding apparatus 50 performs an adaptive loop filter process on the decoded image data after the SAO process has been performed thereon by the adaptive offset filter 67, and outputs the decoded image data after the filter process to the screen rearranging buffer 69 and the frame memory 71.

In step ST110, the image decoding apparatus performs a storing process. The frame memory 71 of the image decoding apparatus 50 stores therein the decoded image data before it is filtered that are supplied from the operator 65 and the decoded image data that are filtered by the deblocking filter 66, the adaptive offset filter 67, and the adaptive loop filter.

In step ST111, the image decoding apparatus performs a screen rearranging process. The screen rearranging buffer 69 of the image decoding apparatus 50 accumulates the decoded image data supplied from the adaptive loop filter 68 and outputs the accumulated decoded image data in a display order before being rearranged by the screen rearranging buffer 21 of the image coding apparatus 10.

In the image decoding apparatus 50, as described above, the adaptive offset filter 67 performs the SAO process on the basis of the parameters supplied from the entropy decoding section 62, and the edge offset process is inhibited depending on a TU in the transformation skip mode in an LCU. Therefore, in case a coding process is performed to include a TU in the transformation skip mode in an LCU for retaining sharp edges, a decoded image whose image quality has been restrained from being lowered can be output.

Furthermore, in the image decoding apparatus 50, since an inter-prediction is selected when the transformation skip mode is used, a decoded image whose image quality has been restrained from being lowered can be output.

Incidentally, in the image coding apparatus 10, in case the input image is of a high dynamic range, information relating to the Hybrid Log Gamma system or the PQ system, for example, is included in a parameter "transfer_characteristics" of video display information VUI (Video Usability Information) or a parameter "preferred_transfer_characteristics" of additional information SEI (Supplement Enhancement Information) in a syntax included in the coded stream. Consequently, in case information indicating that the input image is of a high dynamic range is included in the coded stream, the image decoding apparatus 50 may inhibit an edge offset process in the SAO process.

3. APPLICATION EXAMPLES

Next, application examples of the image processing apparatus according to the present technology will be described below.

First Application Example: Television Receiver

Figure 21:
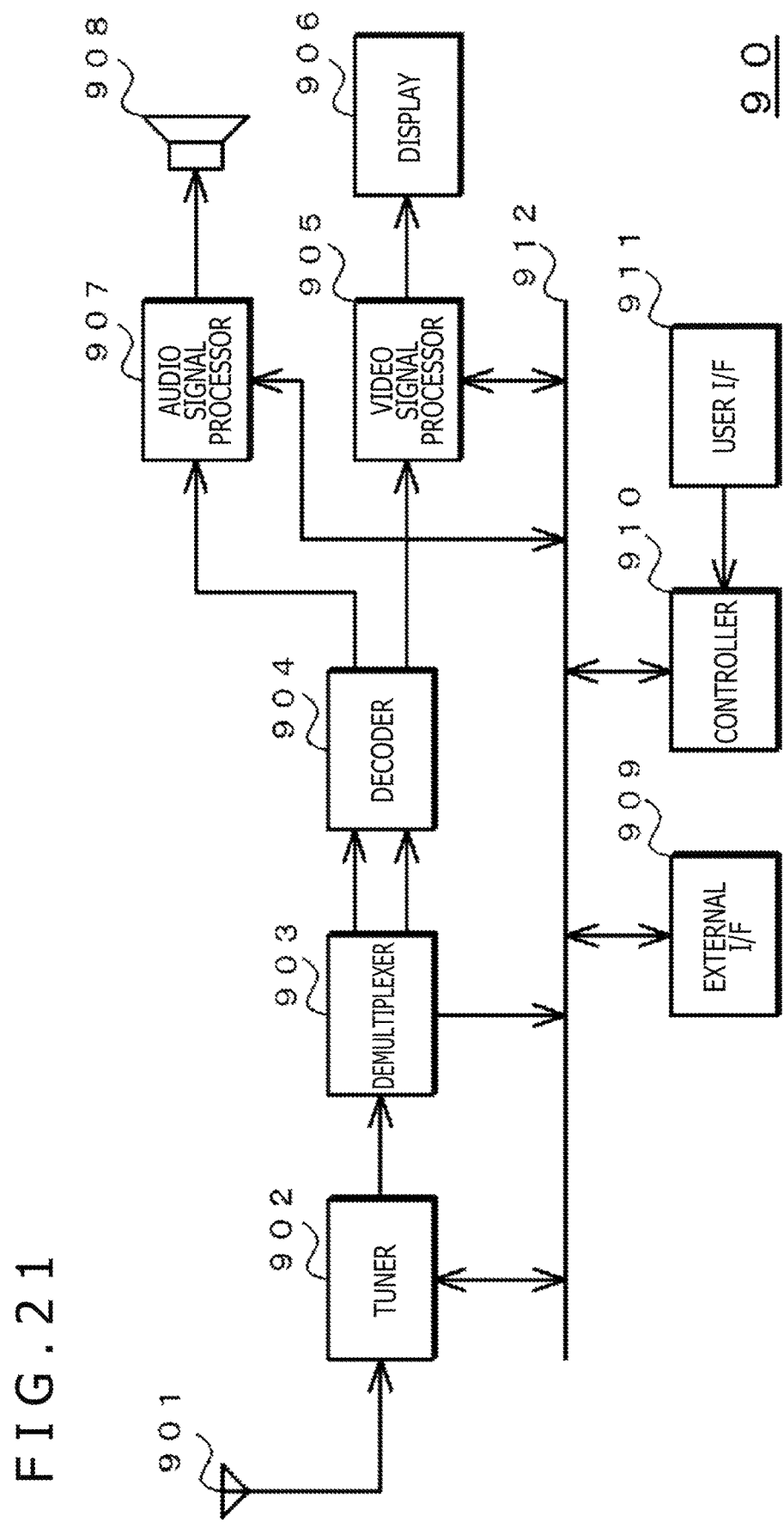
FIG. 21 is a diagram illustrating, by way of example, a general configuration of a television apparatus.

FIG. 21 is a diagram illustrating, by way of example, a general configuration of a television apparatus to which the image processing apparatus described above is applied. The television apparatus 900 includes an antenna 901, a tuner 902, a demultiplexer 903, a decoder 904, a video signal processor 905, a display 906, an audio signal processor 907, a speaker 908, an external interface 909, a controller 910, a user interface 911, and a bus 912.

The tuner 902 extracts a signal in a desired channel from a broadcast signal received through the antenna 901, and demodulates the extracted signal. Then, the tuner 902 outputs a coded bit stream obtained by the demodulation to the demultiplexer 903. In other words, the tuner 902 serves the role as transmitting means in the television apparatus 900, for receiving a coded stream where images are coded.

The demultiplexer 903 separates a video stream and an audio stream of a program to be viewed from the coded hit stream, and outputs the separated streams to the decoder 904. Furthermore, the demultiplexer 903 extracts auxiliary data such as EPG (Electronic Program Guide) or the like from the coded bit stream, and supplies the extracted data to the controller 910. In addition, in case the coded bit stream is scrambled, the demultiplexer 903 may descramble the coded bit stream.

The decoder 904 decodes the video stream and the audio stream input from the demultiplexer 903. Then, the decoder 904 outputs video data generated by the decoding process to the video signal processor 905. Moreover, the decoder 904 outputs audio data generated by the decoding process to the audio signal processor 907.

The video signal processor 905 reproduces the video data input from the decoder 904 and displays video pictures on the display 906. Furthermore, the video signal processor 905 may display an application screen supplied via a network on the display 906. Moreover, the video signal processor 905 may perform an additional process such as noise reduction (suppression), for example, on the video data depending on settings. In addition, the video signal processor 905 may generate an image of GUI (Graphic User Interface) such as a menu, buttons, or a cursor, for example, and superpose the generated image on the output image.

The display 906 is driven by a drive signal supplied from the video signal processor 905 and displays video pictures or images on the video screen of a display device (e.g., a liquid crystal display, a plasma display, or an OELD (Organic ElectroLuminescence Display) (organic EL display, or the like).

The audio signal processor 907 performs a reproducing process such as D/A conversion and amplification on the audio data input from the decoder 904, and outputs sounds from the speaker 908. Furthermore, the audio signal processor 907 may perform an additional process such as noise reduction (suppression), for example, on the audio data.

The external interface 909 is an interface for connecting the television apparatus 900 to an external device or a network. For example, a video stream or an audio stream received via the external interface 909 may be decoded by the decoder 904. In other words, the external interface 909 serves the role as transmitting means in the television apparatus 900, for receiving a coded stream where images are coded.

The controller 910 has a processor such as a CPU or the like and a memory such as a RAM and a ROM or the like. The memory stores programs executed by the CPU, program data, EPG data, and data acquired via a network. The programs stored in the memory are read and executed by the CPU when the television apparatus 900 starts to operate, for example. The CPU controls operation of the television apparatus 900 according to operation signals that are entered from the user interface 911, for example, by executing the programs.

The user interface 911 is connected to the controller 910. The user interface 911 has buttons and switches as well as a remote control signal receiver for the user to operate the television apparatus 900. The user interface 911 detects operations by the user through these components, generates operation signals, and outputs the generated operation signals to the controller 910.

The bus 912 interconnects the tuner 902, the demultiplexer 903, the decoder 904, the video signal processor 905, the audio signal processor 907, the external interface 909, and the controller 910.

In the television apparatus 900 thus constructed, the decoder 904 has the functions of the image decoding apparatus described above. Therefore, when the decoder 904 decodes images in the television apparatus 90, the television apparatus 900 can display decoded images where the image quality is restrained from being lowered.

Second Application Example: Cellular Phone

Figure 22:
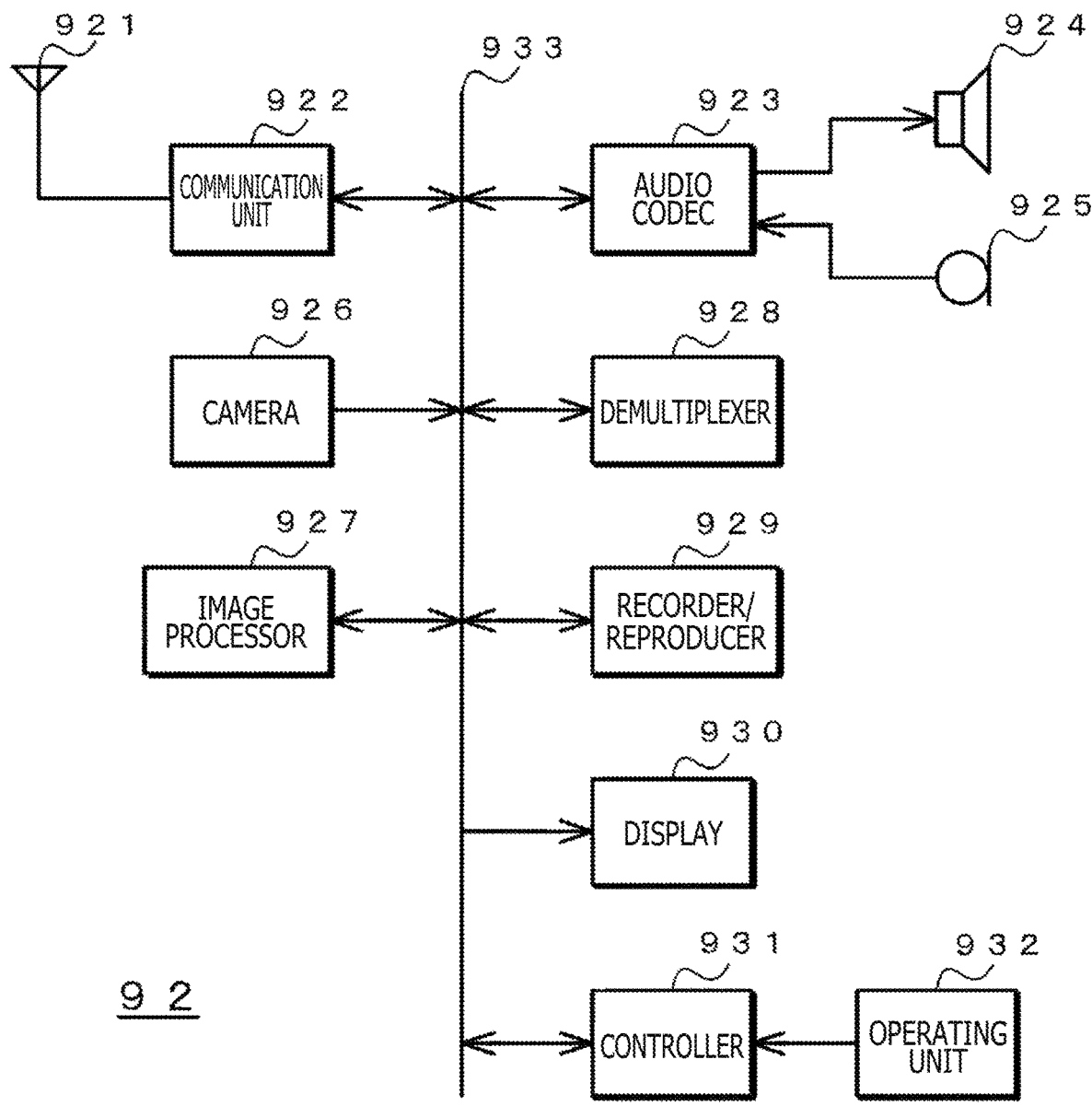
FIG. 22 is a diagram illustrating, by way of example, a general configuration of a cellular phone.

FIG. 22 is a diagram illustrating, by way example, a general configuration of a cellular phone to which the embodiment described above is applied. The cellular phone 920 includes an antenna 921, a communication unit 922, an audio codec 923, a speaker 924, a microphone 925, a camera 926, an image processor 927, a demultiplexer 928, a recorder/reproducer 929, a display 930, a controller 931, an operating unit 932, and a bus 933.

The antenna 921 is connected to the communication unit 922. The speaker 924 and the microphone 925 are connected to the audio codec 923. The operating unit 932 is connected to the controller 931. The bus 933 interconnects the communication unit 922, the audio codec 923, the camera 926, the image processor 927, the demultiplexer 928, the recorder/reproducer 929, the display 930, and the controller 931.

The cellular phone 920 operates to send and receive audio signals, send and receive electronic mails or image data, capture images, and record data in various operation modes including a voice speech mode, a data communication mode, an image capturing mode, and a video telephone mode.

In the voice speech mode, an analog audio signal generated by the microphone 925 is supplied to the audio codec 923. The audio codec 923 converts the analog audio signal into audio data, converts the converted audio data into digital audio data, and compresses the digital audio data. Then, the audio codec 923 outputs the compressed audio data to the communication unit 922. The communication unit 922 codes and modulates the audio data, generating a transmission signal. Then, the communication unit 922 sends the generated transmission signal via the antenna 921 to a base station (not depicted). Furthermore, the communication unit 922 amplifies and frequency-converts a wireless signal received via the antenna 921, acquiring a reception signal. Then, the communication unit 922 demodulates and decodes the reception signal, and outputs generated audio data to the audio codec 923. The audio codec 923 expands the audio data and converts the audio data into analog audio data, generating an analog audio signal. Then, the audio codec 923 supplies the generated audio signal to the speaker 924, which outputs sounds.

In the data communication mode, the controller 931, for example, generates character data of an electronic mail according to a user's operation entered via the operating unit 932. Furthermore, the controller 931 displays characters on the display 930. Moreover, the controller 931 generates electronic mail data according to a transmission instruction from the user entered via the operating unit 932, and outputs the generated electronic mail data to the communication unit 922. The communication unit 922 codes and modulates the electronic mail data, generating a transmission signal. Then, the communication unit 922 sends the generated transmission signal via the antenna 921 to a base station (not depicted). Furthermore, the communication unit 922 amplifies and frequency-converts a wireless signal received via the antenna 921, acquiring a reception signal. Then, the communication unit 922 demodulates and decodes the reception signal, restoring electronic mail data, and outputs the restored electronic mail data to the controller 931. The controller 931 displays the content of the electronic mail on the display 930 and stores the electronic mail data in a storage medium of the recorder/reproducer 929.

The recorder/reproducer 929 has a storage medium where data can be read and written. For example, the storage medium may be a built-in storage medium such as a RAM, a flash memory, or the like, or may be an external add-on storage medium such as a hard disk, a magnetic disk, a magneto-optical disk, an optical disk, a USB (Universal Serial Bus) memory, a memory card, or the like.

In the image capturing mode, the camera 926, for example, captures an image of a subject, generating image data, and outputs the generated image data to the image processor 927. The image processor 927 codes the image data input from the camera 926, and stores a coded stream in the storage medium of the recorder/reproducer 929.

In the video telephone mode, the demultiplexer 928, for example, multiplexes a video stream coded by the image processor 927 and an audio stream input from the audio codec 923, and outputs the multiplexed stream to the communication unit 922. The communication unit 922 codes and modulates the stream, generating a transmission signal. Then, the communication unit 922 sends the generated transmission signal via the antenna 921 to a base station (not depicted). Furthermore, the communication unit 922 amplifies and frequency-converts a wireless signal received via the antenna 921, acquiring a reception signal. The transmission signal and the reception signal include coded bit streams. Then, the communication unit 922 demodulates and decodes the reception signal, restoring a stream, and outputs the restored stream to the demultiplexer 928. The demultiplexer 928 demultiplexes the video stream and the audio stream from the input stream, and outputs the video stream to the image processor 927 and the audio stream to the audio codec 923. The image processor 927 decodes the video stream, generating video data. The video data are supplied to the display 930, which displays a series of images. The audio codec 923 expands the audio stream and converts the audio stream into an analog audio stream, generating an analog audio signal. Then, the audio codec 923 supplies the generated audio signal to the speaker 924, which outputs sounds.

In the cellular phone 920 thus constructed, the image processor 927 has the functions of the image coding apparatus and the image decoding apparatus described above. Therefore, when the image processor 927 codes and decodes images in the cellular phone 920, the cellular phone 920 can output decoded images where the image quality is restrained from being lowered.

Third Application Example: Recording and Reproducing Apparatus

Figure 23:
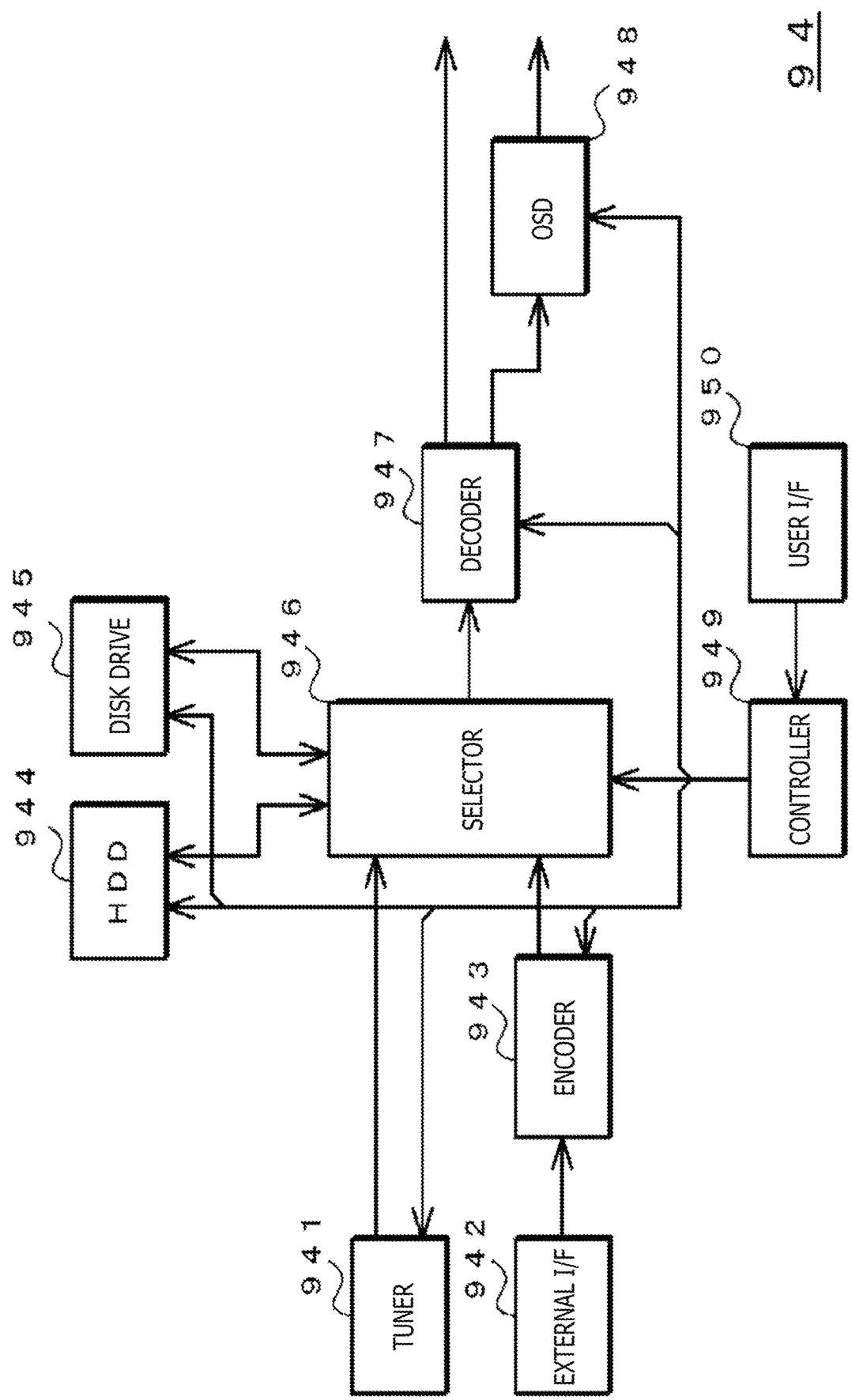
FIG. 23 is a diagram illustrating, by way of example, a general configuration of a recording and reproducing apparatus.

FIG. 23 is a diagram illustrating, by way of example, a general configuration of a recording and reproducing apparatus to which the embodiment described above is applied. The recording and reproducing apparatus 940 codes audio data and video data of a received broadcast program, for example, and records them in a recording medium. Furthermore, the recording and reproducing apparatus 940 may code audio data and video data acquired from another apparatus and record them in a recording medium, for example. Moreover, the recording and reproducing apparatus 940 reproduces data recorded in the recording medium on a monitor and a speaker according to a user's instruction, for example. At this time, the recording and reproducing apparatus 940 decodes audio data and video data.

The recording and reproducing apparatus 940 includes a tuner 941, an external interface 942, an encoder 943, an HDD (Hard Disk Drive) 944, a disk drive 945, a selector 946, a decoder 947, an OSD (On-Screen Display) 948, a controller 949, and a user interface 950.

The tuner 941 extracts a signal in a desired channel from a broadcast signal received through an antenna (not depicted), and demodulates the extracted signal. Then, the tuner 941 outputs a coded bit stream obtained by the demodulation to the selector 946. In other words, the tuner 941 serves the role as transmitting means in the recording and reproducing apparatus 940.

The external interface 942 is an interface for connecting the recording and reproducing apparatus 94 to an external device or a network. For example, the external interface 942 may be an IEEE1394 interface, a network interface, a USB interface, a flash memory interface, or the like, for example. For example, video data and audio data received via the external interface 942 are input to the encoder 943. In other words, the external interface 942 serves the role as transmitting means in the recording and reproducing apparatus 94.

In case video data and audio data input from the external interface 942 have not been coded, the encoder 943 codes the video data and the audio data. Then, the encoder 943 outputs coded bit streams to the selector 946.

The HDD 944 records coded bit streams where contents data such as video data and audio data are compressed, various programs, and other data in an internal hard disk. Furthermore, the HDD 944 reads these data from the hard disk when video pictures and sounds are to be reproduced.

The disk drive 945 records data in and reads data from a recording medium inserted therein. The recording medium inserted in the disk drive 945 may be a DVD disk (DVD-Video, DVD-RAM, DVD-R, DVD-RW, DVD+R, DVD+RW, etc. a Blu-ray (registered trademark), or the like, for example.

For recording video and audio signals, the selector 946 selects coded bit streams input from the tuner 941 or the encoder 943, and outputs the selected coded bit streams to the HDD 944 or the disk drive 945. Furthermore, for reproducing video and audio signals, the selector 946 outputs coded bit streams input from the HDD 944 or the disk drive 945 to the decoder 947.

The decoder 947 decodes the coded bit streams, generating video data and audio data. Then, the decoder 947 outputs the generated video data to the OSD 948. In addition, the decoder 904 outputs the generated audio data to an external speaker.

The OSD 948 reproduces the video data input from the decoder 947, displaying video pictures. Furthermore, the OSD 948 may superpose an image of a GUI such as a menu, buttons, or a cursor, for example, on the displayed video pictures.

The controller 949 has a processor such as a CPU or the like and a memory such as a RAM and a ROM or the like. The memory stores programs executed by the CPU and program data, etc. The programs stored in the memory are read and executed by the CPU when the recording and reproducing apparatus 940 starts to operate, for example. The CPU controls operation of the recording and reproducing apparatus 940 according to operation signals that are entered from the user interface 950, for example, by executing the programs.

The user interface 950 is connected to the controller 949. The user interface 950 has buttons and switches as well as a remote control signal receiver for the user to operate the recording and reproducing apparatus 940. The user interface 950 detects operations by the user through these components, generates operation signals, and outputs the generated operation signals to the controller 949.

In the recording and reproducing apparatus 940 thus constructed, the encoder 943 has the functions of the image coding apparatus described above. The decoder 947 has the functions of the image decoding apparatus described above. Therefore, when images are coded and decoded in the recording and reproducing apparatus 940, the recording and reproducing apparatus 940 can display decoded images where the image quality is restrained from being lowered.

Fourth Application Example: Image Capturing Apparatus

Figure 24:
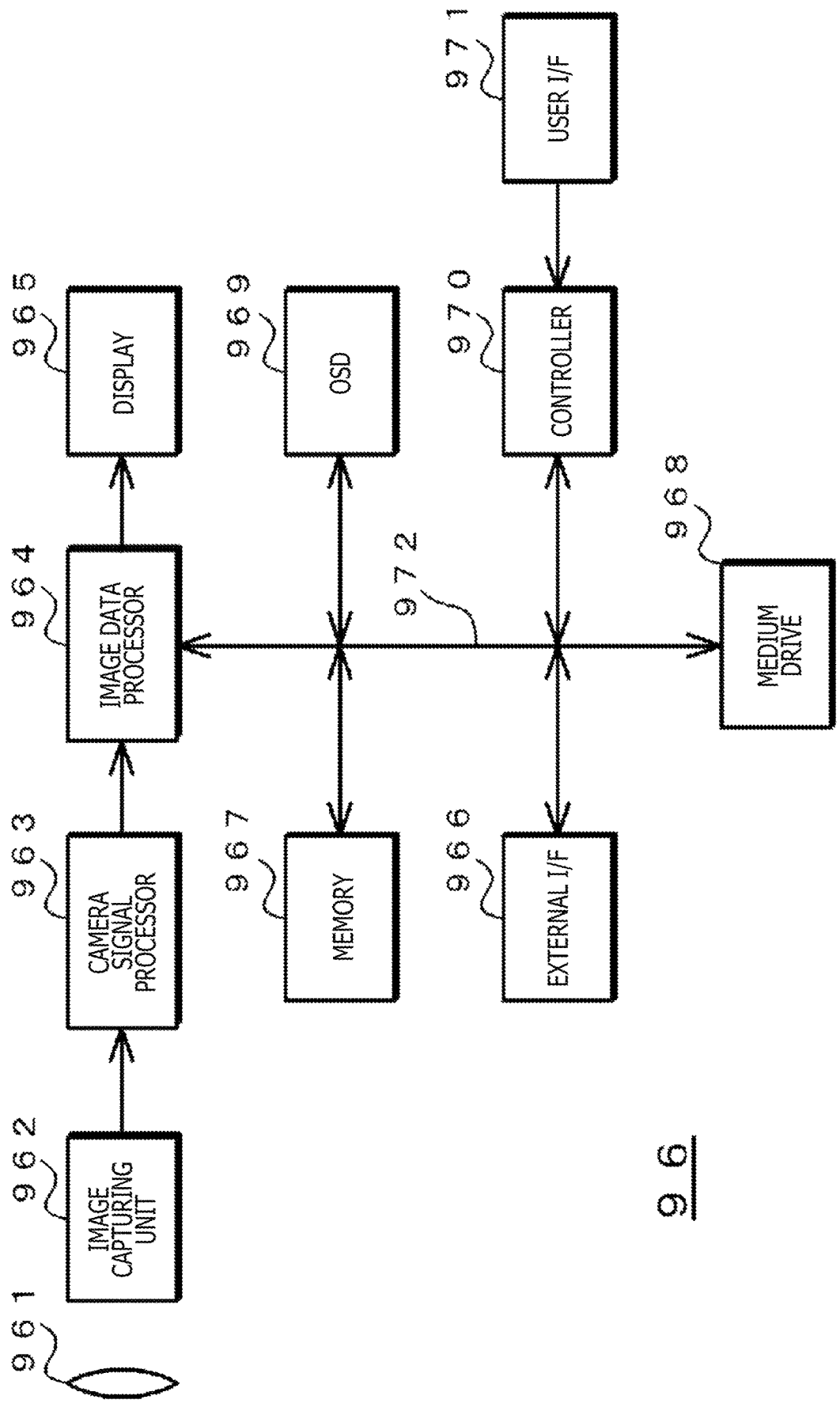
FIG. 24 is a diagram illustrating, by way of example, a general configuration of an image capturing apparatus.

FIG. 24 is a diagram illustrating, by way of example, a general configuration of an image capturing apparatus to which the embodiment described above is applied. The image capturing apparatus 960 captures an image of a subject, generating image data, codes the image data, and records the coded image data in a recording medium.

The image capturing apparatus 960 includes an optical block 961, an image capturing unit 962, a signal processor 963, an image data processor 964, a display 965, an external interface 966, a memory 967, a medium drive 968, an OSD 969, a controller 970, a user interface 971, and a bus 972.

The optical block 961 is connected to the image capturing unit 962. The image capturing unit 962 is connected to the signal processor 963. The display 965 is connected to the image data processor 964. The user interface 971 is connected to the controller 970. The bus 972 interconnects the image data processor 964, the external interface 966, the memory 967, the medium drive 968, the OSD 969, and the controller 970.

The optical block 961 has a focus lens and a diaphragm mechanism. The optical block 961 focuses an optical image of a subject onto an image capturing surface of the image capturing unit 962. The image capturing unit 962 has an image sensor such as a CCD (Charge Coupled Device), a CMOS (Complementary Metal Oxide Semiconductor), or the like, and photoelectrically converts the optical image focused on the image capturing surface into an image signal as an electric signal. Then, the image capturing unit 962 outputs the image signal to the signal processor 963.

The signal processor 963 performs various camera signal processing processes including knee correction, gamma correction, color correction, etc. on the image signal from the image capturing unit 962. The signal processor 963 outputs signal-processed image data to the image data processor 964.

The image data processor 964 codes the image data input from the signal processor 963, generating coded data. Then, the image data processor 964 outputs the generated coded data to the external interface 966 or the medium drive 966. Furthermore, the image data processor 964 decodes coded data input from the external interface 966 or the medium drive 968, generating image data. Then, the image data processor 964 outputs the generated image data to the display 965. Moreover, the image data processor 964 may output the image data input from the signal processor 963 to the display 965 to display an image thereon. In addition, the image data processor 964 may superpose display data acquired from the OSD 969 on an image output to the display 965.

The OSD 969 generates an image of a GUI such as a menu, buttons, or a cursor, for example, and outputs the generated image to the image data processor 964.

The external interface 966 is constructed as an USB input/output terminal, for example. When an image is to be printed, for example, the external interface 966 connects the image capturing apparatus 960 and a printer to each other. If necessary, a drive is connected to the external interface 966. A removable medium such as a magnetic disk, an optical disk, or the like is inserted in the drive, and programs read from the removable medium can be installed in the image capturing apparatus 960. Furthermore, the external interface 966 may be constructed as a network interface connected to a network such as a LAN or the Internet. In other words, the external interface 966 serves the role as transmitting means in the image capturing apparatus 960.

A recording medium inserted in the medium drive 968 may be an arbitrary removable medium where data can be read and written, such as a magnetic disk, a magneto-optical disk, an optical disk, a semiconductor memory, or the like. Furthermore, a recording medium may be fixedly mounted in the medium drive 968, making up a non-portable storage unit such as a built-in hard disk drive or an SSD (Solid State Drive), for example.

The controller 970 has a processor such as a CPU or the like and a memory such as a RAM and a ROM or the like. The memory stores programs executed by the CPU and program data, etc. The programs stored in the memory are read and executed by the CPU when the image capturing apparatus 960 starts to operate, for example. The CPU controls operation of the image capturing apparatus 960 according to operation signals that are entered from the user interface 971, for example, by executing the programs.

The user interface 971 is connected to the controller 970. The user interface 971 has buttons and switches for the user to operate the image capturing apparatus 960. The user interface 971 detects operations by the user through these components, generates operation signals, and outputs the generated operation signals to the controller 970.

In the image capturing apparatus 960 thus constructed, the image data processor 964 has the functions of the image coding apparatus and the image decoding apparatus described above. Therefore, when the image data processor 964 codes and decodes images in the image capturing apparatus 960, the image capturing apparatus 96 can output decoded images where the image quality is restrained from being lowered.

The processing sequences described in the above description can be implemented by hardware, software, or a combination of both. In case the processing sequences are implemented by software, programs where the processing sequences are recorded are installed in a memory in a computer assembled in dedicated hardware, and are executed. Alternatively, the programs may be installed in a general-purpose computer that capable of performing various processes, and may be executed.

For example, the programs may be recorded in advance in a hard disk, an SSD (Solid State Drive), or a ROM (Read Only Memory) as a recording medium. Alternatively, the programs may be temporarily or permanently stored (recorded) in a removable recording medium such as a flexible disk, a CD-ROM (Compact Disc Read Only Memory), an MO (Magneto-Optical) disk, a DVD (Digital Versatile Disk), a BD (Blu-Ray Disc (registered trademark)), a magnetic disk, a semiconductor memory card, or the like. Such a removable recording medium may be provided as so-called package software.

Furthermore, the programs may be transferred from a download site to a computer via a wireless or wired link through a network such as a LAN (Local Area Network), the Internet, or the like, as well as being installed from a removable recording medium into the computer. The computer may receive the programs thus transferred and install the programs into a built-in recording medium such as a hard disk or the like.

The advantages described in the present description are only illustrative, but not limitative, with additional advantages not described being not precluded. The present technology should not be construed as being restricted to the above embodiments of the present technology. The embodiments of the present technology are disclosed by way of illustrative example, and it is obvious for those skilled in the art, to be able to make alterations and substitutions to the embodiments without departing from the principles of the present technology. In other words, the scope of claims should be taken into account for judging the principles of the present technology.

Furthermore, the image processing apparatus according to the present technology may be presented in the following configurations:

(1)

An image processing apparatus including:

a filter processing section that performs a filter process for applying an offset to pixels of a decoded image; and a filter controller that inhibits the offset from being applied to an edge portion depending on occurrence of a transform unit in a transformation skip mode in which orthogonal transformation is not performed on a predicted residual.

(2)

The image processing apparatus according to (1), in which the filter controller inhibits the offset from being applied to the edge portion in case the transform unit in the transformation skip mode is included in a maximum coding unit.

(3)

The image processing apparatus according to (1), in which the filter controller inhibits the offset from being applied to the edge portion in case the ratio of the number of transform units in the transformation skip mode to the number of transform units in a maximum coding unit is equal to or larger than a threshold value.

(4)

The image processing apparatus according to (1), in which the filter controller inhibits the offset from being applied to the edge portion in case the ratio of the number of pixels of transform units in the transformation skip mode to the number of pixels of a maximum coding unit is equal to or larger than a threshold value.

(5)

The image processing apparatus according to (1), in which the filter controller sets a weight depending on a size of a transform unit, and inhibits the offset from being applied to the edge portion in case an evaluation value calculated using the number of transform units in the transformation skip mode in a maximum coding unit and the weight corresponding to the transform units in the transformation skip mode is equal to or larger than a threshold value.

(6)

The image processing apparatus according to (1), in which the filter controller inhibits the offset from being applied to the edge portion in case the decoded image comprises an image having a high dynamic range.

(7)

The image processing apparatus according to any one of (1) through (6), in which the filter controller determines whether an offset for gradation adjustment using the decoded image is to be applied in the filter processing section or not, and sets an offset in case the offset is to be applied.

(8)

The image processing apparatus according to any one of (1) through (7), further including:

a prediction selector that selects a predicted image of either an intra-prediction or an inter-prediction;

in which the prediction selector selects the predicted image of the inter-prediction to calculate the predicted residual in case the transformation skip mode is selected in the inter-prediction.

(9)

The image processing apparatus according to (8), in which the prediction selector selects the predicted image of either the intra-prediction or the inter-prediction on the basis of a costs of the inter-prediction and a cost of the intra-prediction in case the transformation skip mode is not selected in the inter-prediction.

(10)

The image processing apparatus according to (8) or (9), in which the prediction selector selects the predicted image of the inter-prediction in case the transformation skip mode is selected for a transform unit of 4×4 pixels in the inter-prediction.

(11)

The image processing apparatus according to any one of (1) through (10), in which the predicted residual represents the difference between a predicted image generated on the basis of an image as a target to be coded and the decoded image, and the image as the target to be coded.

INDUSTRIAL APPLICABILITY

With the image processing apparatus and the image processing method according to the present technology, a filter process is performed to apply an offset to pixels of a decoded image. Furthermore, the offset is inhibited from being applied to an edge portion depending on the occurrence of a transform unit in a transformation skip mode in which orthogonal transformation is not performed on a predicted residual. Therefore, an offset for correcting a DC component is applied to a transform unit where orthogonal transformation is skipped, making less conspicuous the boundary between a transform unit where orthogonal transformation is performed and the transform unit where orthogonal transformation is skipped. The image quality of the decoded image is thus restrained from being lowered. Consequently, the present technology is suitable for electronic apparatus for coding and decoding moving images.

REFERENCE SIGNS LIST

10 . . . Image coding apparatus
21, 69 . . . Screen rearranging buffer
22, 33, 65 . . . Operator
23 . . . Orthogonal transformation section
24 . . . Quantization section
25 . . . Entropy coding section
26, 61 . . . Accumulation buffer
27 . . . Rate controller
31, 63 . . . Dequantization section
32, 64 . . . inverse orthogonal transformation section
34, 66 . . . Deblocking filter
35, 67 . . . Adaptive offset filter
36, 68 . . . Adaptive loop filter
37, 71 . . . Frame memory
38, 72 . . . Selector
41, 73 . . . intra-predicting section
42 . . . Motion predicting and compensating section
43 . . . Prediction selector
44 . . . Transformation skip controller
50 . . . Image decoding apparatus
62 . . . Entropy decoding section
74 . . . Motion compensating section
351 . . . Filter controller
3511 . . . Switching determining section
3512 . . . Analyzing section
3513 . . . Statistic quantity acquiring section
3514 . . . Mode determining section
3515 . . . Offset determining section
352 . . . Filter processing section

The invention claimed is:

1. An image processing apparatus comprising:
a filter processing section configured to perform a filter process for applying an offset to pixels of a decoded image; and
a filter controller configured to
inhibit the offset from being applied to an edge portion depending on occurrence of a transform unit in a transformation skip mode in which orthogonal transformation is not performed on a predicted residual, and
set a weight depending on a size of the transform unit,
wherein the filter controller inhibits the offset from being applied to the edge portion in case an evaluation value calculated using a number of transform units in the transformation skip mode in a maximum coding unit and the weight corresponding to each transform unit of the transform units in the transformation skip mode is equal to or larger than a threshold value, and
wherein the filter processing section and the filter controller are each implemented via at least one processor.

2. The image processing apparatus according to claim 1, wherein
the filter controller further inhibits the offset from being applied to the edge portion in case the transform unit in the transformation skip mode is included in a maximum coding unit.

3. The image processing apparatus according to claim 1, wherein
the filter controller further inhibits the offset from being applied to the edge portion in case a ratio of the number of transform units in the transformation skip mode to a number of transform units in the maximum coding unit is equal to or larger than a threshold value.

4. The image processing apparatus according to claim 1, wherein
the filter controller further inhibits the offset from being applied to the edge portion in case a ratio of the number of pixels of transform units in the transformation skip mode to a number of pixels of the maximum coding unit is equal to or larger than a threshold value.

5. The image processing apparatus according to claim 1, wherein
the filter controller further inhibits the offset from being applied to the edge portion in case the decoded image includes an image having a high dynamic range.

6. The image processing apparatus according to claim 1, wherein
the filter controller is further configured to
determine whether an offset for gradation adjustment using the decoded image is to be applied in the filter processing section or not, and
set an offset in case the offset is to be applied.

7. The image processing apparatus according to claim 1, further comprising:
a prediction selector configured to select a predicted image of either an intra-prediction or an inter-prediction,
wherein the prediction selector selects the predicted image of the inter-prediction to calculate the predicted residual in case the transformation skip mode is selected in the inter-prediction, and wherein the prediction selector is implemented via at least one processor.

8. The image processing apparatus according to claim 7, wherein the prediction selector further selects the predicted image of either the intra-prediction or the inter-prediction on a basis of a costs of the inter-prediction and a cost of the intra-prediction in case the transformation skip mode is not selected in the inter-prediction.

9. The image processing apparatus according to claim 7, wherein the prediction selector further selects the predicted image of the inter-prediction in case the transformation skip mode is selected for a transform unit of 4×4 pixels in the inter-prediction.

10. The image processing apparatus according to claim 1, wherein the predicted residual represents a difference between a predicted image generated on a basis of an image as a target to be coded and the decoded image, and the image as the target to be coded.

11. The image processing apparatus according to claim 1, wherein the decoded image includes an image produced by adding a predicted residual generated from a coded stream and a predicted image generated by a prediction process.

12. An image processing method comprising:

performing a filter process for applying an offset to pixels of a decoded image;

inhibiting the offset from being applied to an edge portion depending on occurrence of a transform unit in a transformation skip mode in which orthogonal transformation is not performed on a predicted residual; and setting a weight depending on a size of the transform unit, wherein the offset is inhibited from being applied to the edge portion in case an evaluation value calculated using a number of transform units in the transformation skip mode in a maximum coding unit and the weight corresponding to each transform unit of the transform units in the transformation skip mode is equal to or larger than a threshold value.

* * * * *